United States Patent
Manolakos et al.

(10) Patent No.: US 10,708,007 B2
(45) Date of Patent: Jul. 7, 2020

(54) METHODS AND APPARATUSES FOR INDICATION OF TRANSMISSION PREEMPTION BASED ON A HYBRID AUTOMATIC REPEAT REQUEST CONFIGURATION

(71) Applicant: QUALCOMM Incorporated, San Diego, CA (US)

(72) Inventors: Alexandros Manolakos, San Diego, CA (US); Jing Jiang, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 85 days.

(21) Appl. No.: 15/857,228

(22) Filed: Dec. 28, 2017

(65) Prior Publication Data

US 2018/0191470 A1 Jul. 5, 2018

Related U.S. Application Data

(60) Provisional application No. 62/442,916, filed on Jan. 5, 2017.

(51) Int. Cl.
*H04L 1/18* (2006.01)
*H04W 72/04* (2009.01)
*H04W 72/12* (2009.01)

(52) U.S. Cl.
CPC .......... *H04L 1/1861* (2013.01); *H04L 1/1854* (2013.01); *H04L 1/1864* (2013.01);
(Continued)

(58) Field of Classification Search
None
See application file for complete search history.

(56) References Cited

U.S. PATENT DOCUMENTS

2015/0055545 A1* 2/2015 Palanki ............... H04B 7/2606
370/312
2017/0215188 A1* 7/2017 Kim .................. H04W 72/0446
(Continued)

OTHER PUBLICATIONS

INTEL Corporation: "Downlink URLLC Transmission and Multiplexing with eMBB", 3GPP Draft; R1-1612003, INTEL—URLLC DL MUX, 3rd Generation Partnership Project (3GPP), Mobile Competence Centre; 650, Route Des Lucioles ; F-06921 Sophia-Antipolis Cedex ; France, vol. RAN WG1, No. Reno, USA; Nov. 14, 2016-Nov. 18, 2016, Nov. 13, 2016 (Nov. 13, 2016), XP051175967, 9 Pages, Retrieved from the Internet: URL:http://www.3gpp.org/ftp/Meetings_3GPP_SYNC/RAN1/Docs/ [retrieved on Nov. 13, 2016].
(Continued)

*Primary Examiner* — Charles C Jiang
*Assistant Examiner* — Saad Khawar
(74) *Attorney, Agent, or Firm* — Harrity & Harrity, LLP

(57) ABSTRACT

A method, an apparatus, and a computer program product for wireless communication are provided. The apparatus may receive, at a first location in a downlink signal, preemption information that identifies a second location of a first type of traffic that preempts a second type of traffic, the first location relative to the second location being based at least in part on a hybrid automatic repeat request (HARQ) configuration of the UE. The apparatus may receive the first type of traffic at the second location. The apparatus may generate a HARQ response associated with the first type of traffic. The apparatus may transmit the HARQ response based at least in part on the HARQ configuration of the UE.

30 Claims, 20 Drawing Sheets

(52) U.S. Cl.
CPC ... *H04W 72/0446* (2013.01); *H04W 72/0453* (2013.01); *H04W 72/12* (2013.01)

(56) References Cited

U.S. PATENT DOCUMENTS

2018/0063749 A1* 3/2018 Islam .................... H04L 1/0075
2018/0083758 A1* 3/2018 Islam .................... H04L 5/0083

OTHER PUBLICATIONS

International Search Report and Written Opinion—PCT/US2017/069039—ISA/EPO—dated Apr. 9, 2018.
SONY: "Dynamic Resource Sharing for eMBB/URLLC in DL", 3GPP Draft; R1-1613047—REL-14 NR—EMBB URLLC MUX V05, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051176971, 5 Pages, Retrieved from the Internet: URL:http://www.3gpp.org/ftp/Meetings_3GPP_SYNC/RAN1/Docs/ [retrieved on Nov. 13, 2016].
ZTE et al: "URLLC and eMBB Frame Structure and Multiplexing", 3GPP TSG RAN WG1 Meeting #86, Lisbon, Portugal, R1-1608957, Oct. 9, 2016 (Oct. 9, 2016), XP051149010, 7 Pages, Retrieved from the Internet:URL:http://www.3gpp.org/ftp/Meetings_3GPP_SYNC/RAN1/Docs/, [retrieved on Oct. 9, 2016].

* cited by examiner

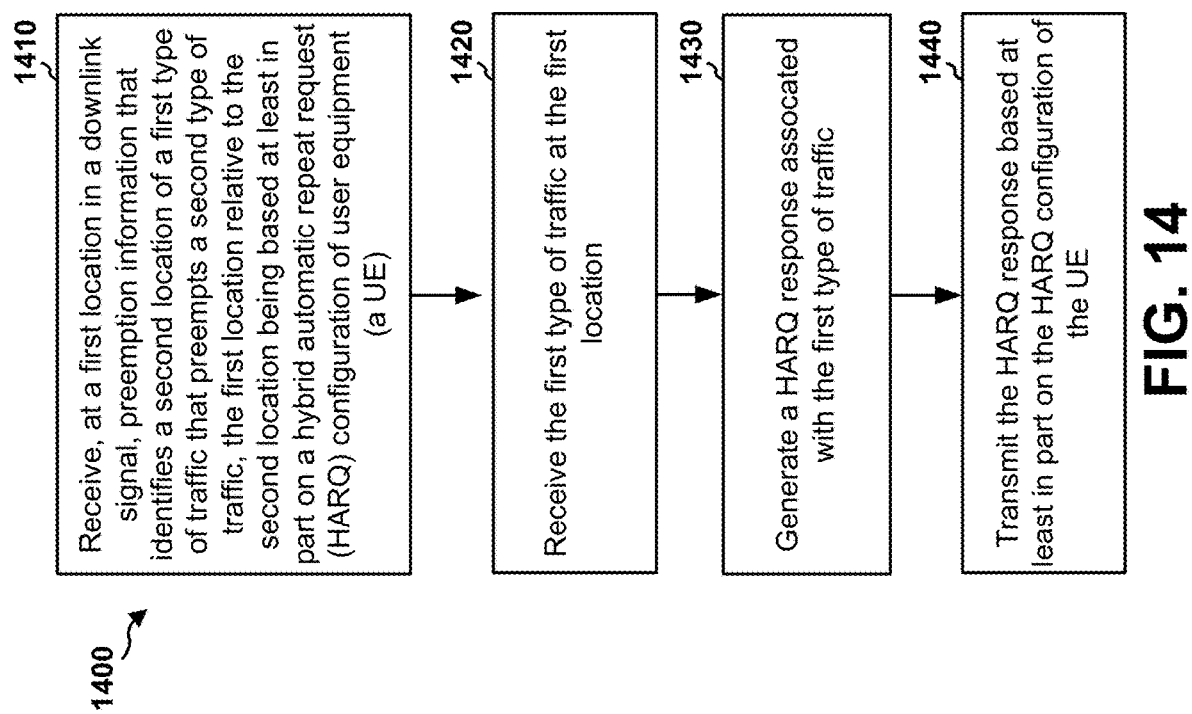

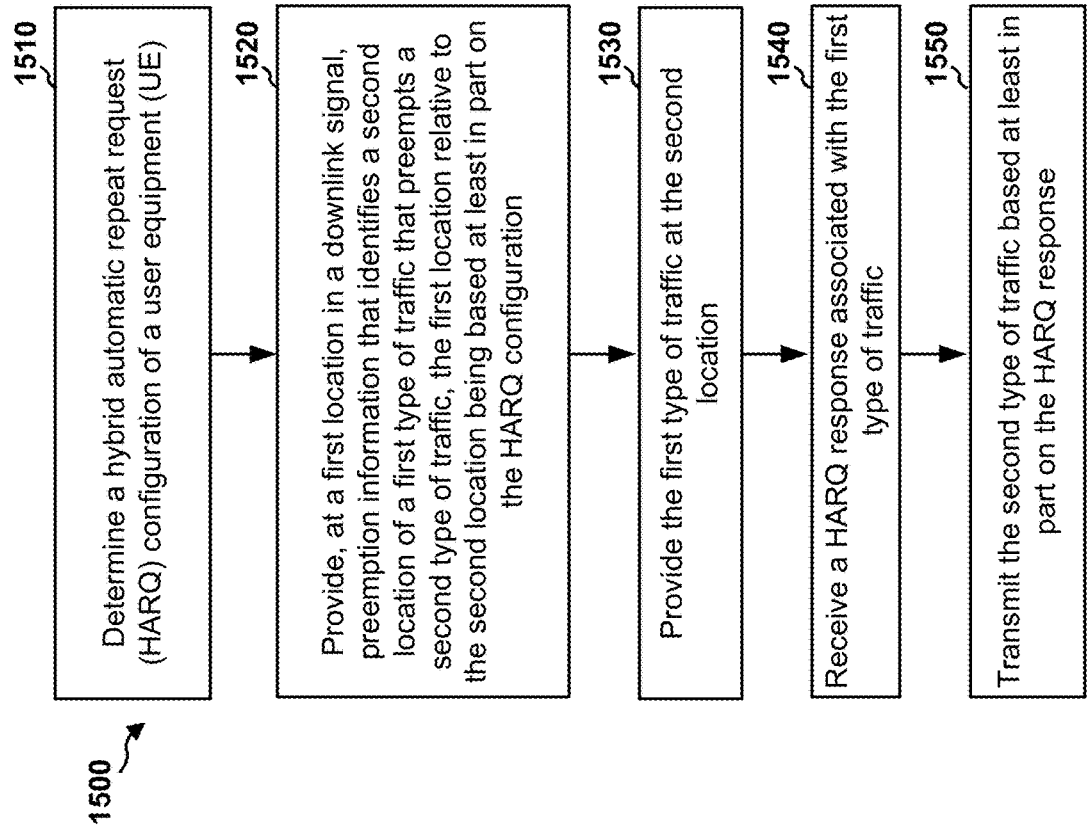

METHODS AND APPARATUSES FOR INDICATION OF TRANSMISSION PREEMPTION BASED ON A HYBRID AUTOMATIC REPEAT REQUEST CONFIGURATION

CROSS-REFERENCE TO RELATED APPLICATION UNDER 35 U.S.C. § 119

This application claims priority to Provisional Patent Application No. 62/442,916, filed Jan. 5, 2017, entitled "METHODS AND APPARATUSES FOR INDICATION OF TRANSMISSION PREEMPTION BASED ON A HYBRID AUTOMATIC REPEAT REQUEST CONFIGURATION," which is hereby expressly incorporated by reference herein.

BACKGROUND

Field

Aspects of the present disclosure generally relate to wireless communication, and more particularly to techniques and apparatuses for indication of transmission preemption based on a hybrid automatic repeat request (HARQ) configuration.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include receiving, at a first location in a downlink signal, preemption information that identifies a second location of a first type of traffic that preempts a second type of traffic, the first location relative to the second location being based at least in part on a hybrid automatic repeat request (HARQ) configuration of a UE. The method may include receiving the first type of traffic at the second location. The method may include generating, by the UE, a HARQ response associated with the first type of traffic. The method may include transmitting the HARQ response based at least in part on the HARQ configuration of the UE.

In some aspects, the apparatus may include a memory and at least one processor coupled to the memory. The at least one processor may be configured to receive, at a first location in a downlink signal, preemption information that identifies a second location of a first type of traffic that preempts a second type of traffic, the first location relative to the second location being based at least in part on a hybrid automatic repeat request (HARQ) configuration of the apparatus. The at least one processor may be configured to receive the first type of traffic at the second location. The at least one processor may be configured to generate a HARQ response associated with the first type of traffic. The at least one processor may be configured to transmit the HARQ response based at least in part on the HARQ configuration of the apparatus.

In some aspects, the apparatus may include means for receiving, at a first location in a downlink signal, preemption information that identifies a second location of a first type of traffic that preempts a second type of traffic, the first location relative to the second location being based at least in part on a hybrid automatic repeat request (HARQ) configuration of the apparatus. The apparatus may include means for receiving the first type of traffic at the second location. The apparatus may include means for generating, by the UE, a HARQ response associated with the first type of traffic. The apparatus may include means for transmitting the HARQ response based at least in part on the HARQ configuration of the apparatus.

In some aspects, the computer program product may include a non-transitory computer-readable medium storing computer executable code. The code may include code for receiving, at a first location in a downlink signal, preemption information that identifies a second location of a first type of traffic that preempts a second type of traffic, the first location relative to the second location being based at least in part on a hybrid automatic repeat request (HARQ) configuration of a UE. The code may include code for receiving the first type of traffic at the second location. The code may include code for generating, by the UE, a HARQ response associated with the first type of traffic. The code may include code for transmitting the HARQ response based at least in part on the HARQ configuration of the UE.

In some aspects, the method may include determining a hybrid automatic repeat request (HARQ) configuration of a UE. The method may include providing, at a first location in a downlink signal, preemption information that identifies a second location of a first type of traffic that preempts a second type of traffic, the first location relative to the second location being based at least in part on the HARQ configuration. The method may include providing the first type of traffic at the second location. The method may include receiving a HARQ response associated with the first type of traffic. The method may include transmitting the second type of traffic based at least in part on the HARQ response.

In some aspects, the apparatus may include a memory and at least one processor coupled to the memory. The at least one processor may be configured to determine a hybrid automatic repeat request (HARQ) configuration of a UE. The at least one processor may be configured to provide, at a first location in a downlink signal, preemption information that identifies a second location of a first type of traffic that preempts a second type of traffic, the first location relative to the second location being based at least in part on the HARQ configuration. The at least one processor may be configured to provide the first type of traffic at the second location. The at least one processor may be configured to receive a HARQ response associated with the first type of traffic. The at least one processor may be configured to transmit the second type of traffic based at least in part on the HARQ response.

In some aspects, the apparatus may include means for determining a hybrid automatic repeat request (HARQ) configuration of a UE. The apparatus may include means for providing, at a first location in a downlink signal, preemption information that identifies a second location of a first type of traffic that preempts a second type of traffic, the first location relative to the second location being based at least in part on the HARQ configuration. The apparatus may include means for providing the first type of traffic at the second location. The apparatus may include means for receiving a HARQ response associated with the first type of traffic. The apparatus may include means for transmitting the second type of traffic based at least in part on the HARQ response.

In some aspects, the computer program product may include a non-transitory computer-readable medium storing computer executable code. The code may include code for determining a hybrid automatic repeat request (HARQ) configuration of a UE. The code may include code for providing, at a first location in a downlink signal, preemption information that identifies a second location of a first type of traffic that preempts a second type of traffic, the first location relative to the second location being based at least in part on the HARQ configuration. The code may include code for providing the first type of traffic at the second location. The code may include code for receiving a HARQ response associated with the first type of traffic. The code may include code for transmitting the second type of traffic based at least in part on the HARQ response.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 14 is a flow chart of a method of wireless communication.

FIG. 15 is a flow chart of a method of wireless communication.

DETAILED DESCRIPTION

Figure 1:
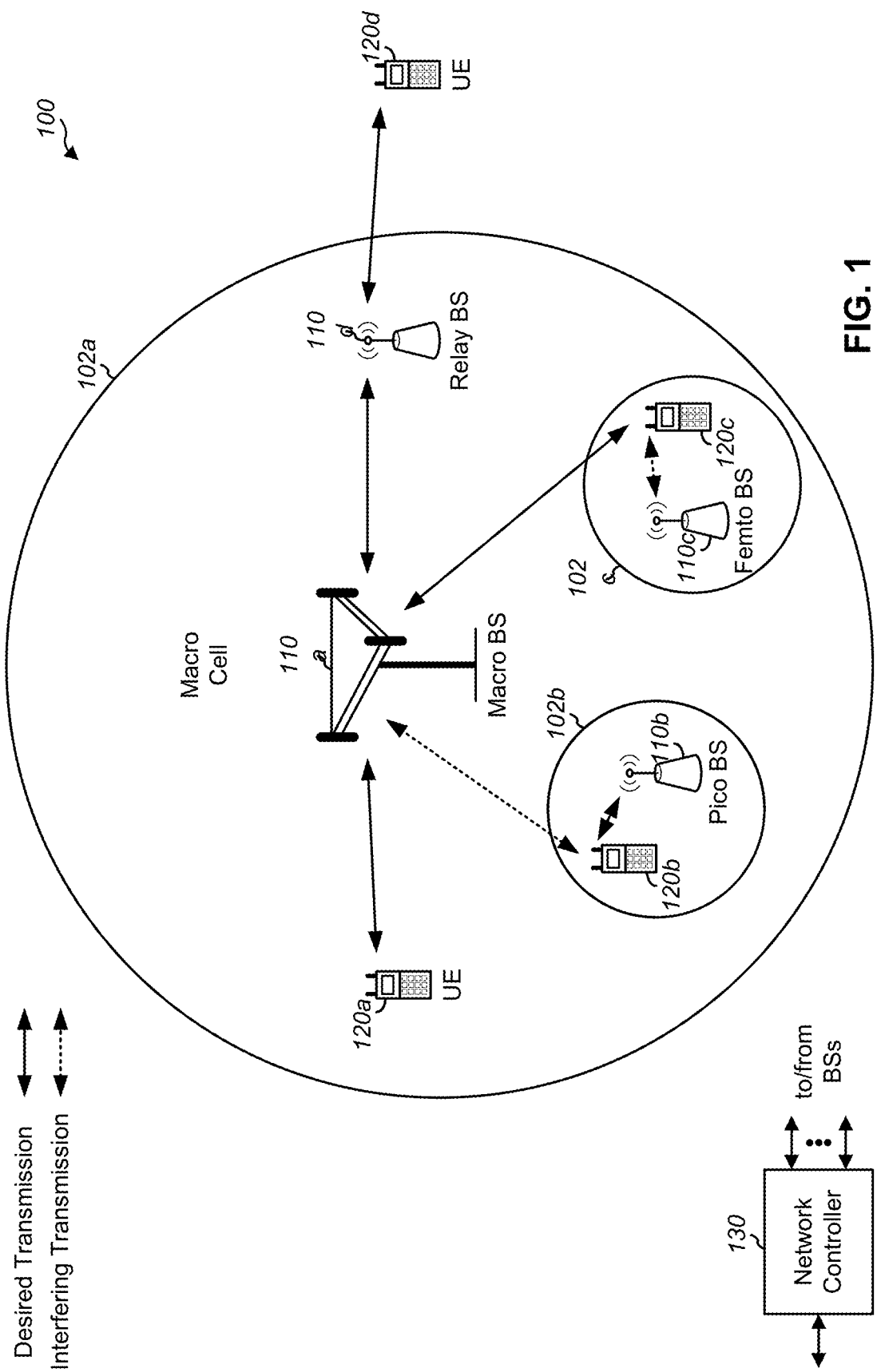
FIG. 1 is diagraml illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
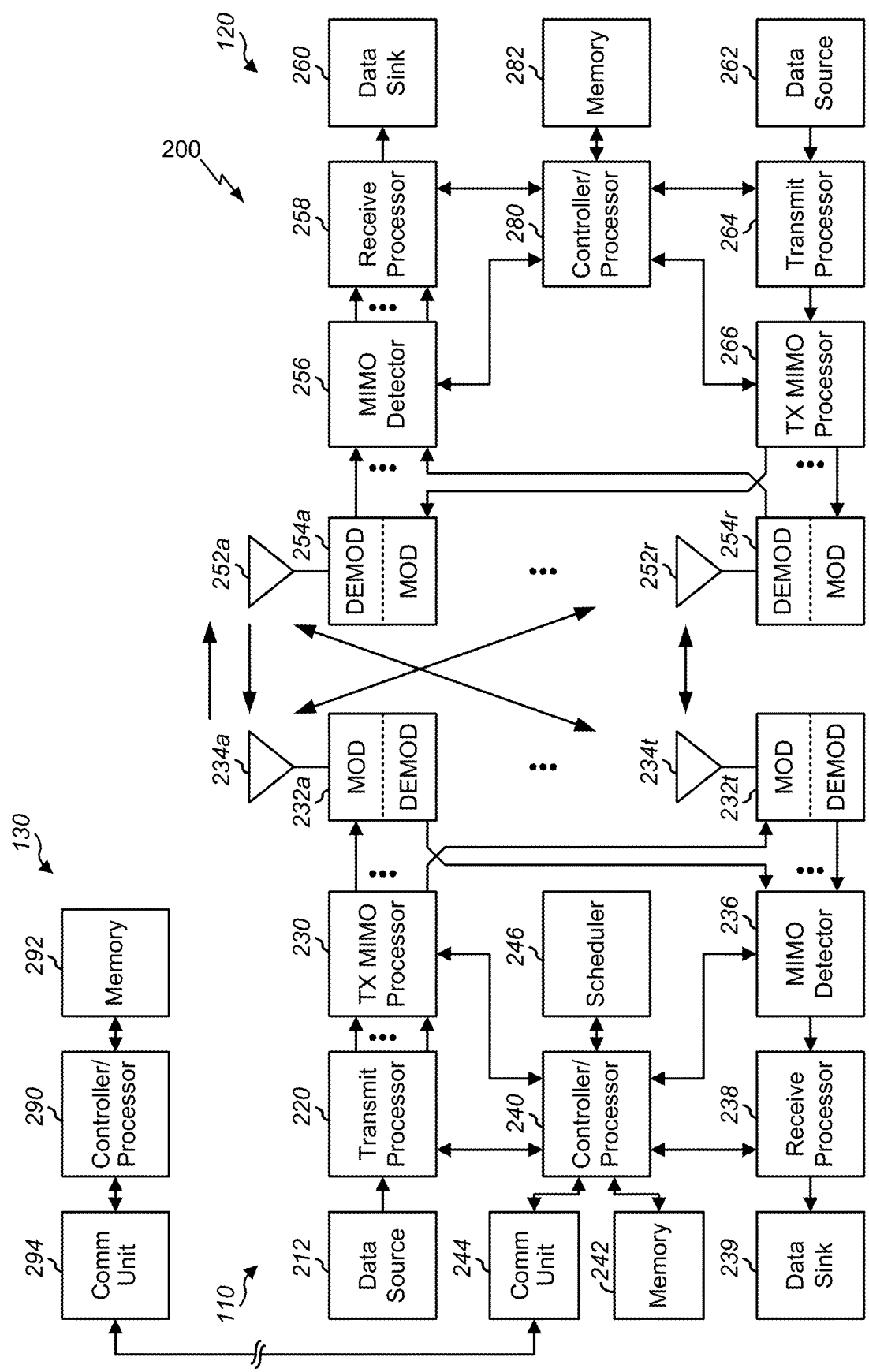
FIG. 2 is a diagram illustrating an example of a base station in communication with a user equipment (UE) in a wireless communication network.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform indication of transmission preemption based on a hybrid automatic repeat request (HARQ) configuration. For example, controller/processor 280 and/or other processors and modules at BS 110, may perform or direct operations of UE 120 to perform indication of transmission preemption based on a hybrid automatic repeat request (HARQ) configuration. For example, controller/processor 280 and/or other controllers/processors and modules at BS 110 may perform or direct operations of, for example, example process 1400 of FIG. 14, example process 1500 of FIG. 15, and/or other processes as described herein. In some aspects, one or more of the components shown in FIG. 2 may be employed to perform example process 1400 of FIG. 14, example process 1500 of FIG. 15, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
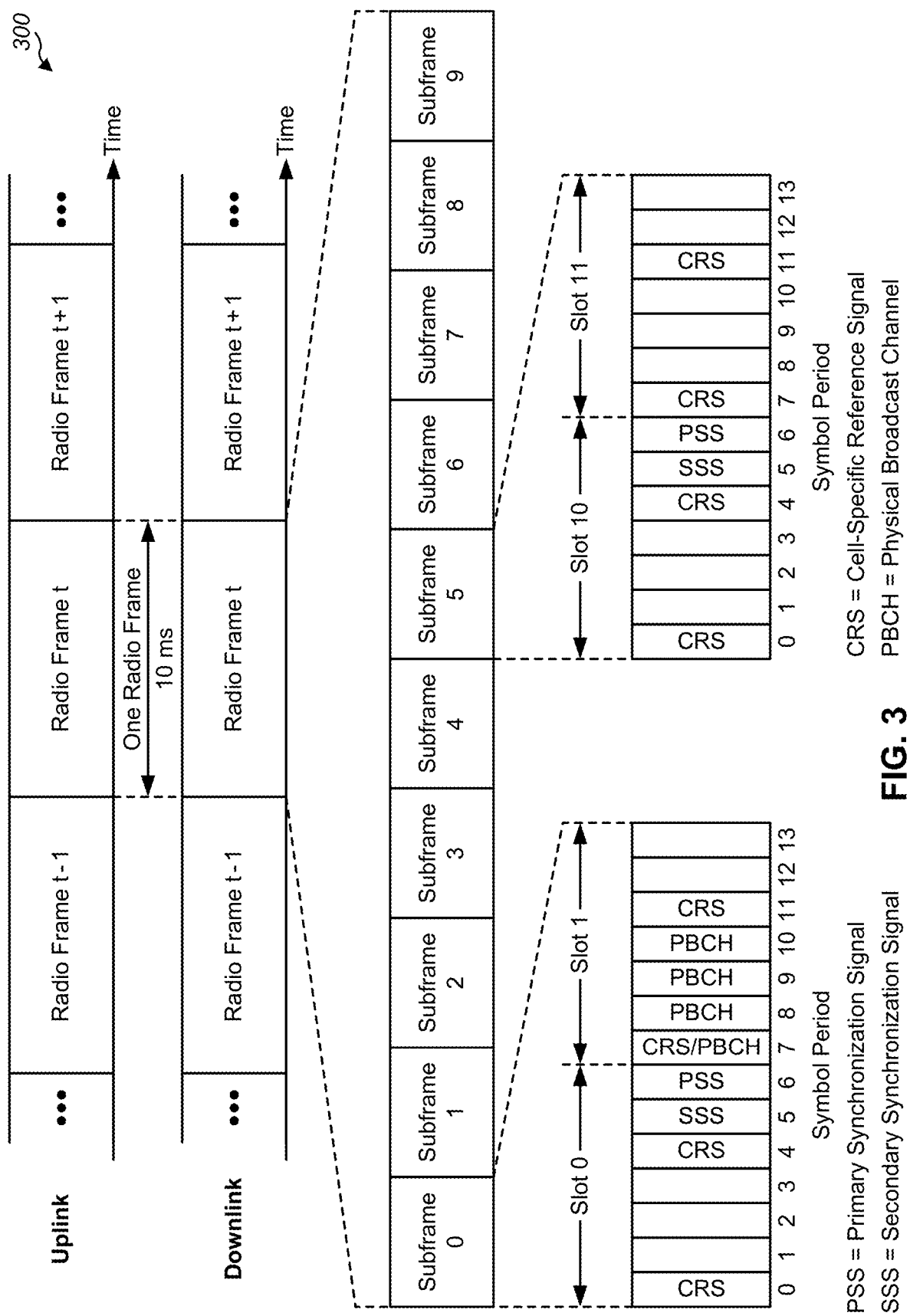
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
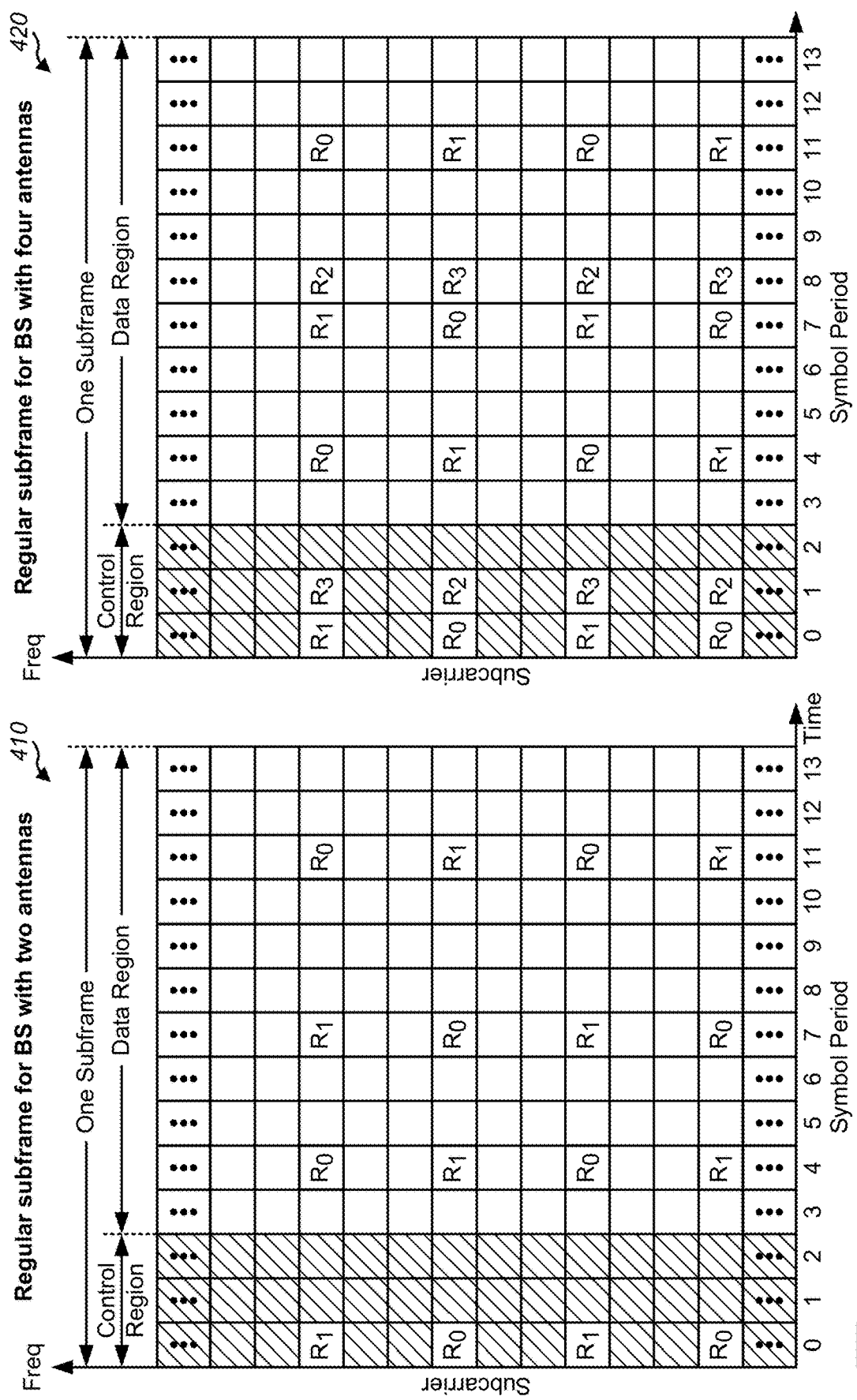
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. In some aspects, a subframe may have a different length and/or may include a different quantity of slots or mini-slots. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
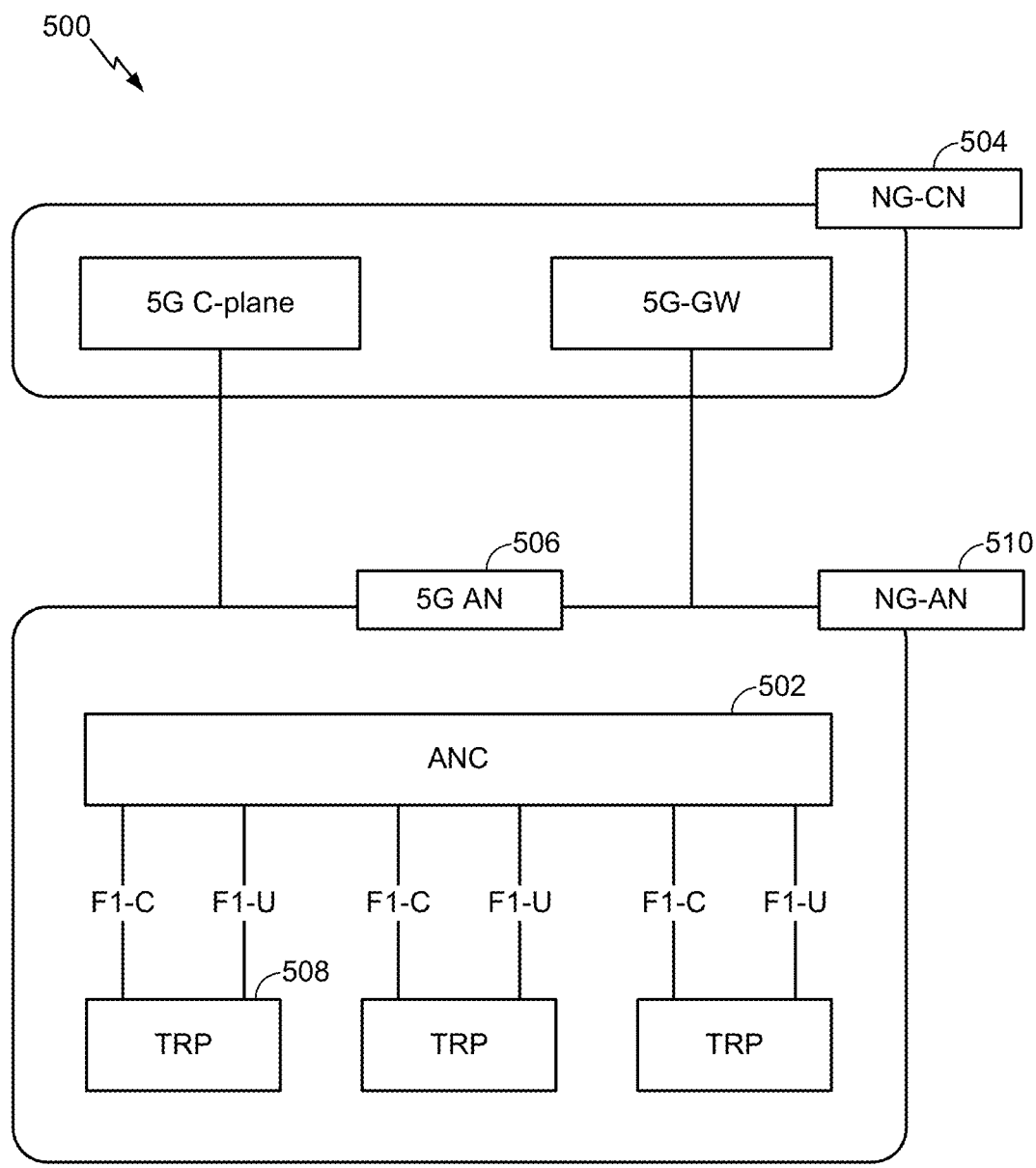
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
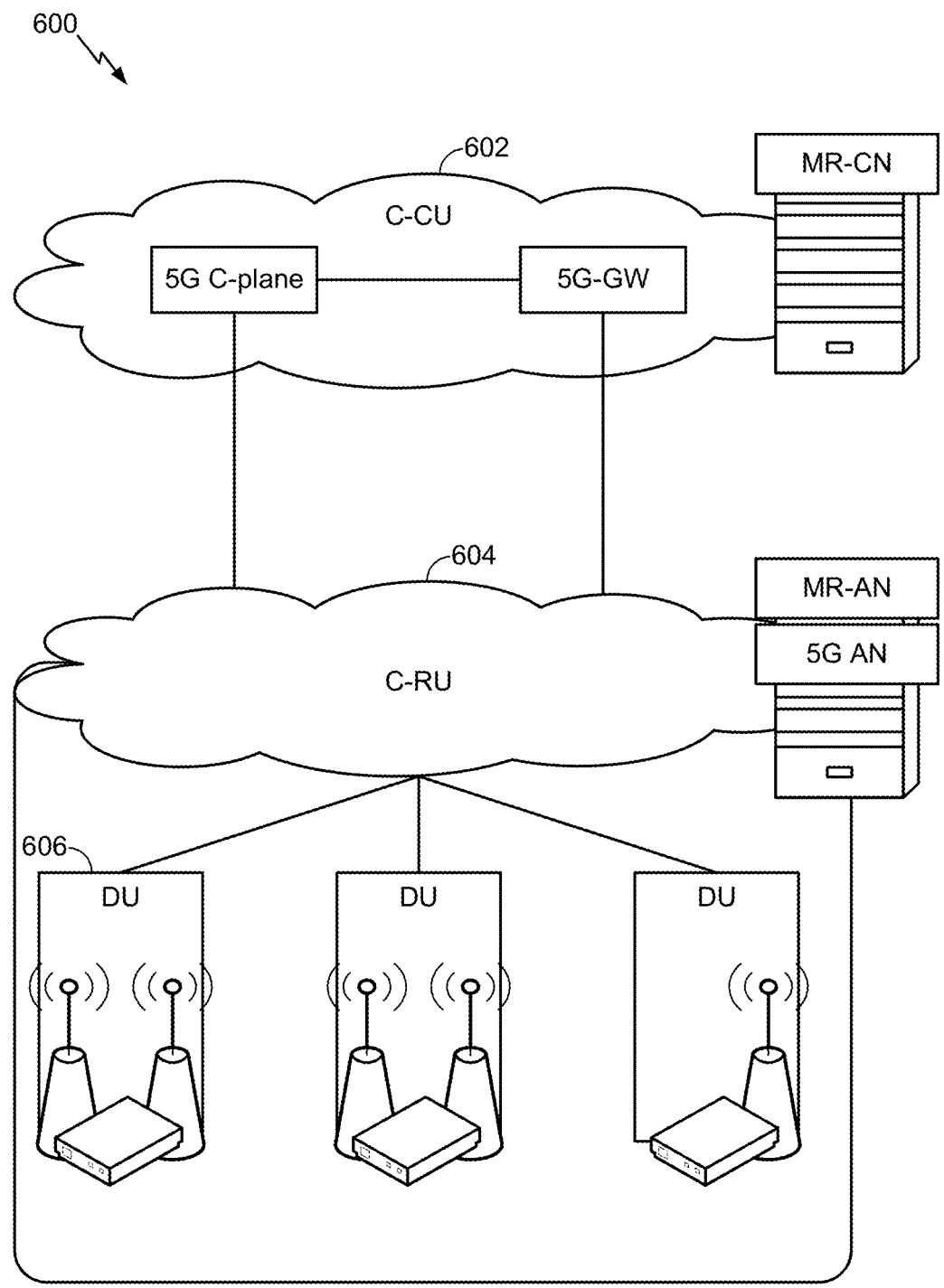
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
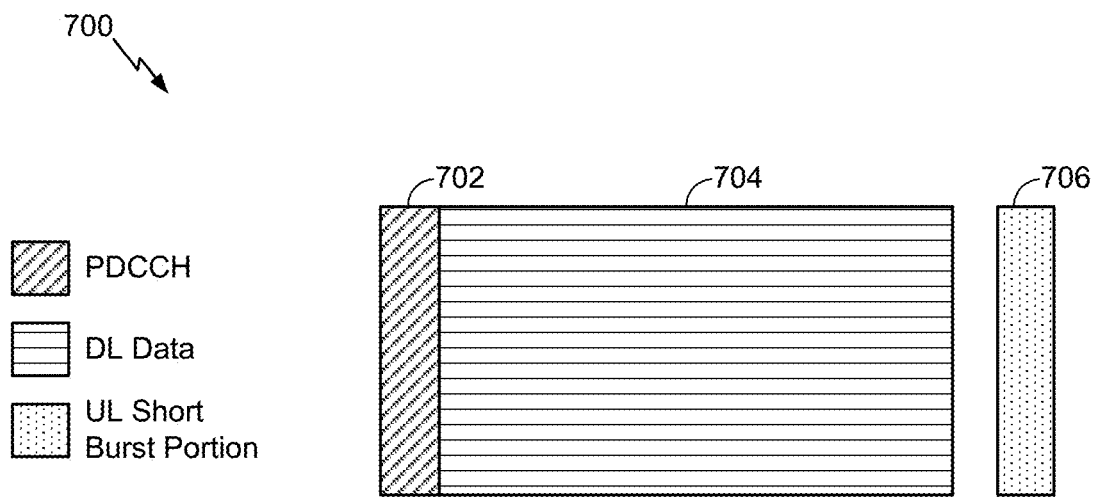
FIG. 7 is a diagram illustrating an example of a downlink (DL)-centric wireless communication structure.

FIG. 7 is a diagram showing an example 700 of a DL-centric wireless communication structure. The DL-centric wireless communication structure (also referred to herein as a DL-centric subframe or a DL-centric slot) may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, information may be carried on a portion of the control portion 702. In such a case, the portion of the control portion 702 may be referred to as a mini-slot. An example of a mini-slot of the control portion 702 carrying preemption information is described with regard to FIG. 12, below.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH). In some aspects, the DL data portion 704 may carry network traffic that may be preempted by other network traffic. For example, the network traffic that is preempted may be referred to herein as preempted network traffic, and the other network traffic that preempts the network traffic may be referred to as preempting network traffic, puncturing network traffic, high-priority network traffic, and/or the like. In some aspects, the preempting network traffic may be associated with ultra-reliable low latency communications, or a similar service.

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a HARQ indicator or HARQ response, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
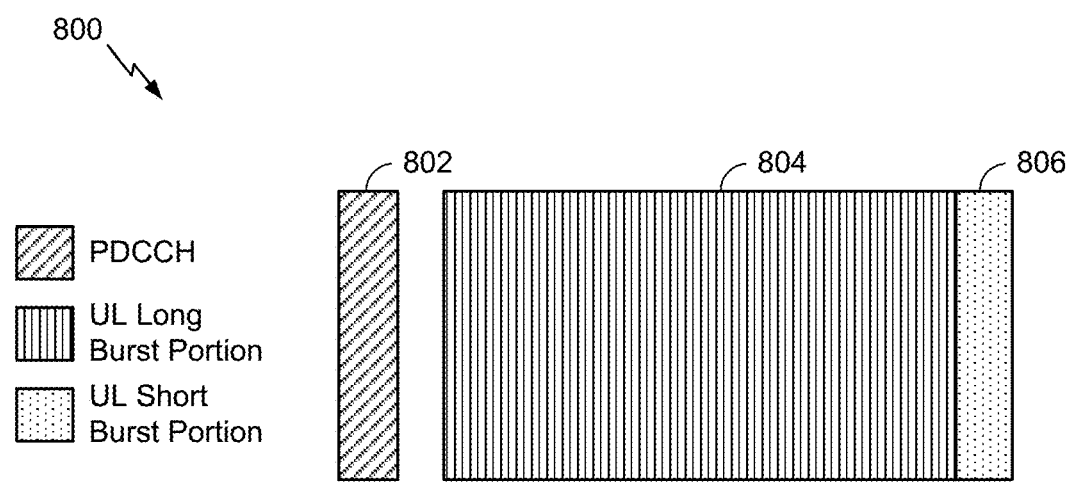
FIG. 8 is a diagram illustrating an example of an uplink (UL)-centric wireless communication structure.

FIG. 8 is a diagram 800 showing an example of an UL-centric wireless communication structure. The UL-centric wireless communication structure (also referred to herein as an UL-centric subframe or an UL-centric slot) may include a control portion 802. The control portion 802 may exist in the initial or beginning portion of the UL-centric slot. The control portion 802 in FIG. 8 may be similar to the control portion 702 described above with reference to FIG. 7. In some configurations, the control portion 802 may be a physical DL control channel (PDCCH).

The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In some aspects, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples are possible and may differ from what was described with regard to FIG. 8.

Figure 9:
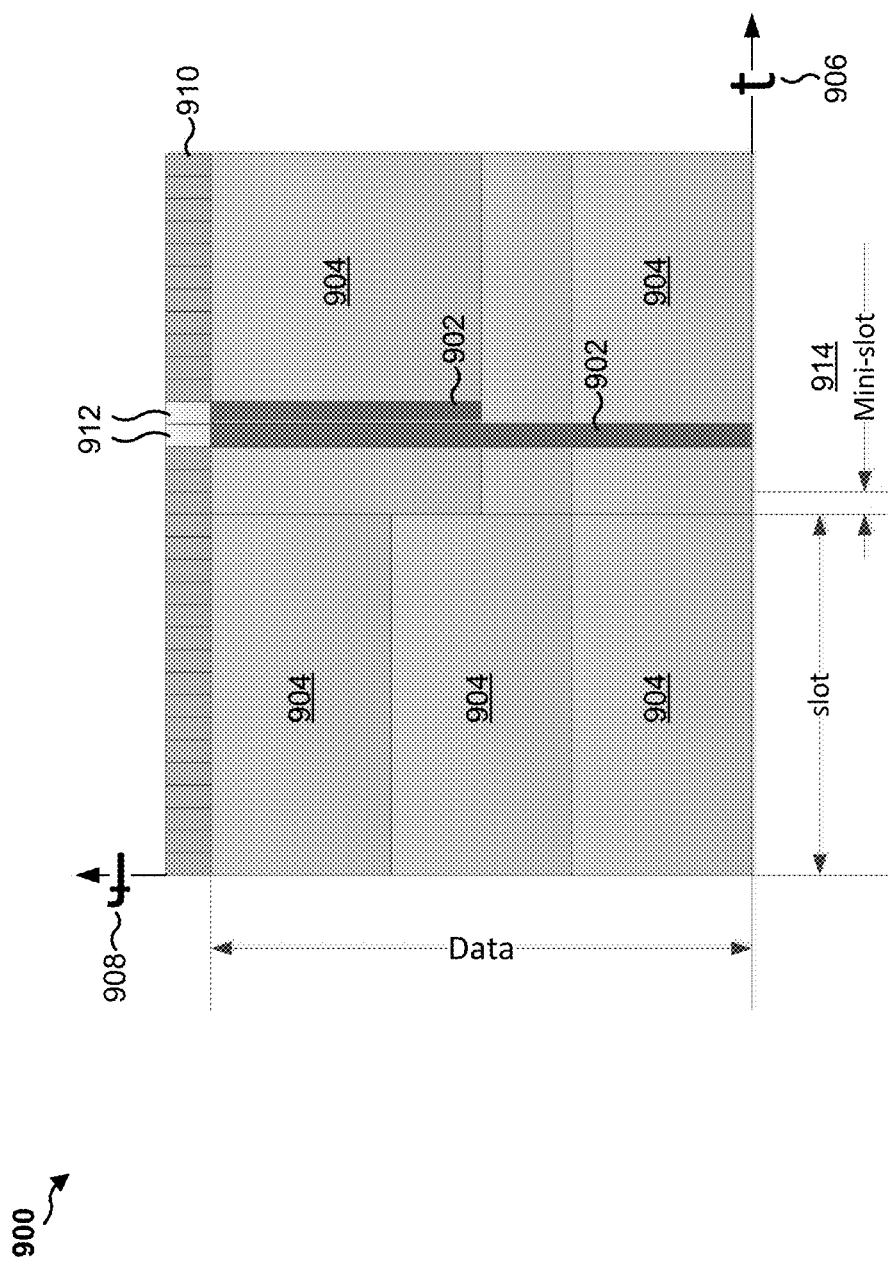
FIG. 9 is a diagram illustrating an example of providing preemption information regarding preempted network traffic using a pre-notification or concurrent notification approach.

FIG. 9 is a diagram illustrating an example 900 of providing preemption information regarding preempted network traffic using a pre-notification or concurrent notification approach.

A BS 110 may provide data to a UE 120 on a downlink connection to the UE 120. Some data may be associated with a higher priority level than other data. For example, a particular type of data may be provided as part of a low-latency transmission and/or an ultra-reliable transmission, may be associated with a particular service level requirement, and/or the like. When the BS 110 receives a high-priority type of data, the BS 110 may interrupt transmission of a lower-priority type of data to provide the high-priority type of data, in order to satisfy the latency requirements, reliability requirements, and/or the like. In such a case, the transmission of the high-priority type of data may be referred to as preempting, interrupting, or puncturing the transmission of the low-priority type of data.

When a data transmission is punctured, a recipient UE 120 may fail to decode or process the data transmission. For example, the recipient UE 120 may expect to receive data that was preempted by the puncturing data transmission, and may therefore fail to process the data transmission. Thus, puncturing of the data transmission may degrade downlink performance of the UE 120.

To obtain data that is preempted by a high-priority type of data transmission, the UE 120 may transmit a HARQ response that identifies the data that is preempted. However, it may be difficult for the UE 120 to identify the data that is preempted, particularly on the fly. Also, the UE 120 may use significant processor and buffer resources to store and process puncturing data, which may be wasted when the puncturing data is irrelevant to the UE 120.

Methods and apparatuses described herein provide, to the UE 120, preemption information identifying preempted network traffic. The preemption information may be selectively provided in the same slot as the preempted network traffic, or in a later slot than the preempted network traffic, based at least in part on whether the UE 120 is configured for or capable of same-slot HARQ responses. For example, the preemption information may be provided in the same slot as the preempted network traffic when the UE 120 is configured to perform a same-slot HARQ response (e.g., based at least in part on a HARQ interlacing structure of the UE 120), which reduces time required to configure retransmission of the preempted network traffic. Further, the preemption information may be provided as part of a later slot when the UE 120 is configured to perform a subsequent-slot HARQ response (e.g., based at least in part on a HARQ interlacing structure of the UE 120), which conserves resources of the BS 110 and/or the UE 120, and which enables the preemption information to be provided as part of a downlink control portion of the later slot. In some aspects, the preemption information may be provided in a different periodicity than the preempted network traffic, and/or may be provided with an offset in comparison to the preempted network traffic, which improves flexibility of the preemption information. Additionally, or alternatively, the preemption information may be provided periodically and/or may be associated with a particular periodicity.

FIG. 9 shows a first type of network traffic 902 that preempts transmission of a second type of network traffic 904. For example, the first type of network traffic 902 may be associated with ultra-reliable low latency communications, and the second type of network traffic 904 may be associated with an eMBB UE 120, and/or the like. As shown by reference number 906, the horizontal axis of FIG. 9 shows locations in time of the first type of network traffic 902 and the second type of network traffic 904. As shown by reference number 908, the vertical axis of FIG. 9 shows frequency bands of the first type of network traffic 902 and the second type of network traffic 904. For example, a BS 110 may schedule and transmit network traffic to a UE 120 on particular time slots or mini-slots (shown by the horizontal axis), and on particular frequencies or channels (shown by the vertical axis).

As shown by reference number 910, in some aspects, preemption information may be provided on a different frequency band than network traffic 902 and 904. For example, the preemption information may be provided in a channel that is separate from or not overlapping a data channel of the UE 120. The preemption information is shown by reference number 912. As shown, the preemption information is provided concurrently with or before the first type of network traffic 902. Thus, the UE 120 may identify and process the first type of network traffic 902 according to the preemption information. For example, the UE 120 may drop the first type of network traffic 902, may buffer the first type of network traffic 902, may transmit a HARQ response requesting the second type of network traffic 904 that was preempted by the first type of network traffic 902, and/or the like, as described in more detail in connection with FIGS. 11A-13B, below.

As shown by reference number 914, the first type of network traffic 902 and/or the preemption information may be provided in one or more mini-slots. A mini-slot may include a portion of a slot or subframe. For example, a mini-slot may include one or more symbols, and a slot may include two or more mini-slots. By providing the first type of network traffic 902 and/or the preemption information within a mini-slot, the BS 110 may reduce latency of providing preemption information. In some aspects, the BS 110 may provide the preemption information and/or the first type of network traffic 902 in one or more mini-slots when the first type of network traffic 902 is associated with an ultra-reliable low-latency communication.

As indicated above, FIG. 9 is provided as an example. Other examples are possible and may differ from what was described with respect to FIG. 9.

Figure 10:
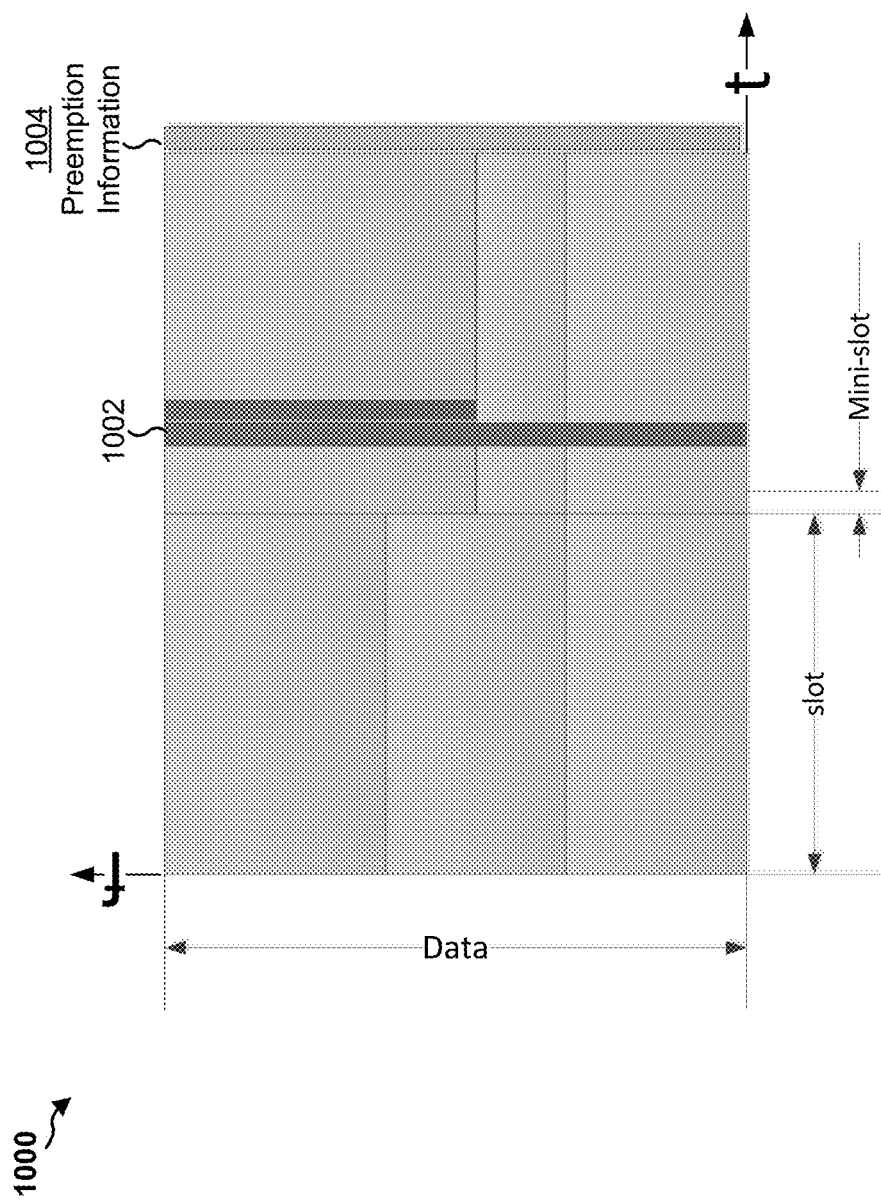
FIG. 10 is a diagram illustrating an example of providing preemption information regarding preempted network traffic using a post-notification approach.

FIG. 10 is a diagram illustrating an example 1000 of providing preemption information regarding preempted network traffic using a post-notification approach. As shown in FIG. 10, and by reference number 1002, a first type of network traffic 1002 may preempt a second type of network traffic. In some aspects, the first type of network traffic 1002 may correspond to the first type of network traffic 902, and the second type of network traffic may correspond to the second type of network traffic 904.

As shown by reference number 1004, in some aspects, the UE 120 may receive preemption information after the first type of network traffic 1002 is received. For example, the preemption information may identify a location (e.g., time, frequency, channel, resource block, slot, mini-slot, etc.) associated with the first type of network traffic 1002 (e.g., based at least in part on a slot, mini-slot, and/or channel associated with the first type of network traffic 1002, and/or the like). As further shown, in a situation where the preemption information is received after the first type of network traffic 1002, the preemption information may be received on the same channel as the first type of network traffic 1002 and/or the second type of network traffic, or on a channel that is at least partially shared with the first type of network traffic 1002 and/or the second type of network traffic. By providing the preemption information on the same channel, bandwidth resources are conserved that would otherwise be used to provide the preemption information on a different channel (e.g., as when the preemption information is provided simultaneously with the first type of network traffic 1002, shown in FIG. 9).

FIGS. 9 and 10 describe preemption indication using a concurrent notification approach and a post-notification approach. However, other locations and configurations of the preemption information are possible. For example, in some aspects, preemption information may be provided with a particular offset (e.g., in symbols, mini-slots, slots, subframes, etc.) from the preempted traffic. As an example, assume that the particular offset is 6 mini-slots. In that case, the BS 110 may provide preemption information with an offset of 6 mini-slots from the preempted traffic. In some aspects, the preemption information may be provided after the preempted traffic based at least in part on the particular offset. In some aspects, the preemption information may be provided before the preempted traffic based at least in part on the particular offset. Providing the preemption information with an offset may improve time diversity in comparison to providing the preemption information concurrently with the preempted traffic.

In some aspects, the preemption information may be associated with a particular periodicity. For example, the preemption information may be provided once per subframe, in a particular slot or mini-slot of a subframe, every second subframe, every fifth slot, or with a different periodicity. In such a case, the preemption information may indicate the preempted traffic before the traffic is preempted, concurrently with the traffic being preempted, after the traffic is preempted, or a combination of the above. For example, when the preemption information is provided periodically, the preemption information may indicate that a first slot concurrent with the preemption information is punctured and that a second slot before the preemption information was punctured. Providing the preemption information periodically may improve predictability of network traffic, thereby simplifying scheduling.

As indicated above, FIG. 10 is provided as an example. Other examples are possible and may differ from what was described with respect to FIG. 10.

Figure 11A:
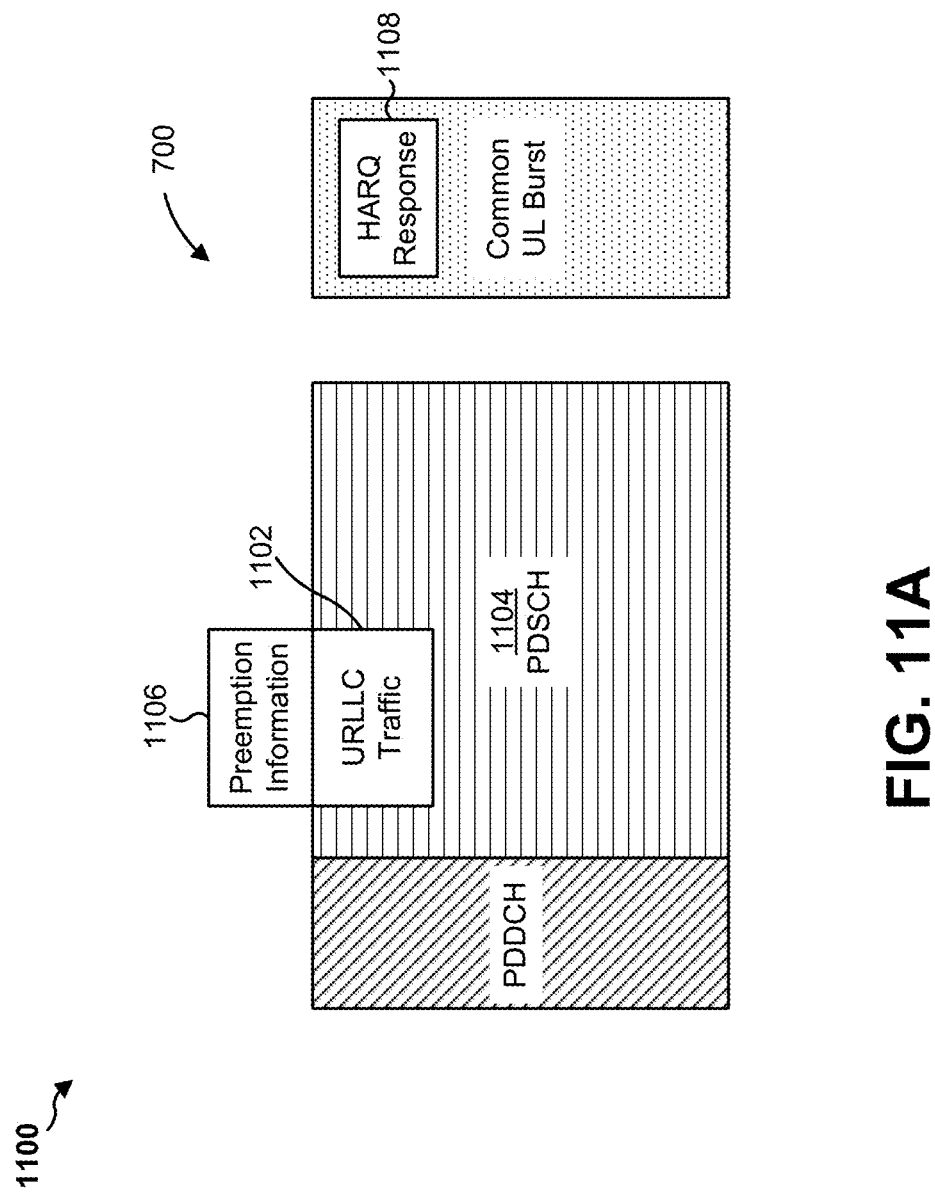
FIGS. 11A and 11B are diagrams illustrating examples of providing same-slot preemption information for user equipment associated with a same-slot HARQ response configuration.
Figure 11B:
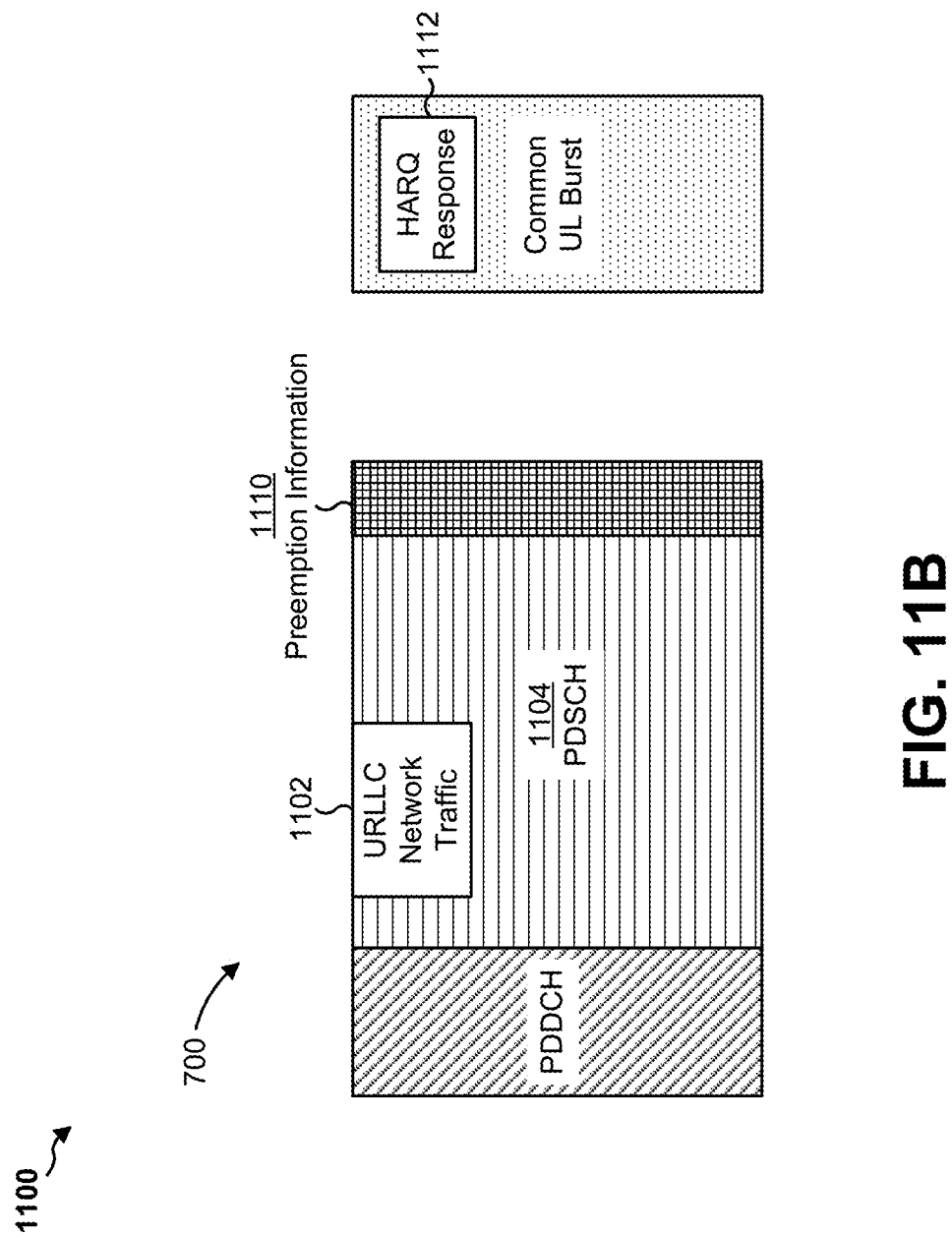

FIGS. 11A and 11B are diagrams illustrating examples 1100 of providing same-slot preemption information for user equipment associated with a same-slot HARQ response configuration. FIGS. 11A and 11B describe preemption information and preempted network traffic with regard to slots. In some aspects, the slots may include DL-centric slots or subframes, which are described in more detail in connection with FIG. 7, above. Additionally, or alternatively, the slots may include another type of slot, or a downlink portion of a slot. For the purpose of FIGS. 11A and 11B, assume that a BS 110 transmits traffic on a slot to a UE 120. Assume further that the UE 120 is configured to provide a same-slot HARQ response.

As shown in FIG. 11A, a first type of traffic 1102 may preempt a second type of traffic 1104. As shown, the first type of traffic 1102 is associated with ultra-reliable low latency communication (URLLC). As further shown, the second type of traffic 1104 is provided in a PDSCH of the slot. In some aspects, the PDSCH may correspond to the DL data portion 704 described in connection with FIG. 7. In some aspects, the second type of traffic 1104 may include eMBB traffic, and/or the like. In some aspects, the UE 120 may be a recipient of the second type of traffic 1104, and the first type of traffic 1102 may be destined for a different UE 120 or for the UE 120 that is the recipient of the second type of traffic 1104. Therefore, it may be advantageous to indicate to the UE 120, using preemption information, that the second type of traffic 1104 is to be interrupted by the first type of traffic 1102.

As shown by reference number 1106, and as described in connection with FIG. 9, in some aspects, the preemption information may be provided in a different channel or frequency band than the first type of traffic 1102 and/or the second type of traffic 1104 (shown here using displacement in the vertical direction). In such a case, the preemption information may be provided as part of a same slot and/or mini-slot as the first type of traffic 1102. This, in turn, may allow the UE 120 to conserve processor and buffer resources that would otherwise be used to attempt to decode the first type of traffic 1102. For example, the UE 120 may not attempt to decode the first type of traffic 1102, may discard or may not determine soft bit information associated with the first type of traffic 1102, and/or the like in a situation where, for example, the first type of traffic 1102 is intended for another UE 120.

In some aspects, the preemption information may be broadcast to multiple, different UEs 120. For example, the preemption information may be provided in a particular channel or frequency band. UEs 120 may receive the particular channel or frequency band, and may determine whether traffic, en route to the UEs 120, has been interrupted or preempted. By broadcasting the preemption information to multiple, different UEs 120, network resources are conserved that would otherwise be used to separately unicast respective preemption information to the multiple, different UEs 120. For example, when the BS 110 interrupts traffic for multiple, different UEs 120, it may be resource intensive to generate respective preemption information for each of the UEs 120. The BS 110 may conserve processor resources and network overhead by broadcasting preemption information that identifies preemptions for all of the multiple, different UEs 120.

The BS 110 may provide the preemption information in the same slot and/or mini-slot when the UE 120 is configured to provide same-slot HARQ responses. For example, some UEs 120 may be capable of and configured to provide a HARQ response for DL data within the same slot or subframe that the DL data is received. For such UEs 120, the BS 110 may provide the preemption information for the first type of traffic 1102 within the same slot as the first type of traffic 1102. As used herein, a same-slot HARQ configuration may refer to a configuration to perform a HARQ response within a quantity of HARQ interlaces that causes the UE 120 to provide the response in the same slot as the first type of traffic 1102 (e.g., one interlace two interlaces, and/or the like).

As shown by reference number 1108, the UE 120 may provide a HARQ response within a common UL burst of the slot in which the first type of traffic 1102 is received. The HARQ response may include a NACK for the second type of traffic 1104 to cause the second type of traffic 1104 to be retransmitted to the UE 120. In some aspects, the UE 120 may identify the second type of traffic 1104 to be retransmitted based at least in part on the preemption information. For example, the preemption information may identify particular mini-slots, resource blocks, frequency bands, channels, and/or the like, that were preempted by the first type of traffic 1102. The UE 120 may use the HARQ response to request retransmission of the particular mini-slots, resource blocks, frequency bands, channels, and/or the like. In some aspects, the HARQ response may indicate successful receipt of the first type of traffic 1102. In some aspects, the HARQ response may correspond to the first type of traffic 1102 and the second type of traffic 1104. For example, the HARQ response may indicate successful receipt of the first type of traffic 1102 and unsuccessful receipt of the second type of traffic 1104. In some aspects, the HARQ response may include separate HARQ responses for the first type of traffic 1102 and the second type of traffic 1104. In some aspects, the HARQ response may jointly encode a HARQ response for the first type of traffic 1102 and a HARQ response for the second type of traffic 1104. In this way, the UE 120 provides a same-slot HARQ response to request retransmission of interrupted network traffic according to preemption information, which reduces latency of retransmitting the interrupted network traffic and improves downlink performance of the UE 120.

FIG. 11B shows an example where the preemption information is received after the first type of network traffic. In FIG. 11B, the preemption information is shown by reference number 1110. As further shown, the preemption information is provided on the same frequency band or bands as the first type of traffic 1102. This may conserve frequency resources that would otherwise be used to provide the preemption information on a different channel or frequency band. As shown by reference number 1112, the UE 120 provides a same-slot HARQ response to cause retransmission of portions of the second type of traffic 1104 that were interrupted, as is described in more detail in connection with FIG. 11A. In this way, the UE 120 provides a same-slot HARQ response to request retransmission of interrupted network traffic according to preemption information, which reduces latency of retransmitting the interrupted network traffic and improves downlink performance of the UE 120.

As indicated above, FIGS. 11A and 11B are provided as examples. Other examples are possible and may differ from what was described with respect to FIGS. 11A and 11B.

Figure 12:
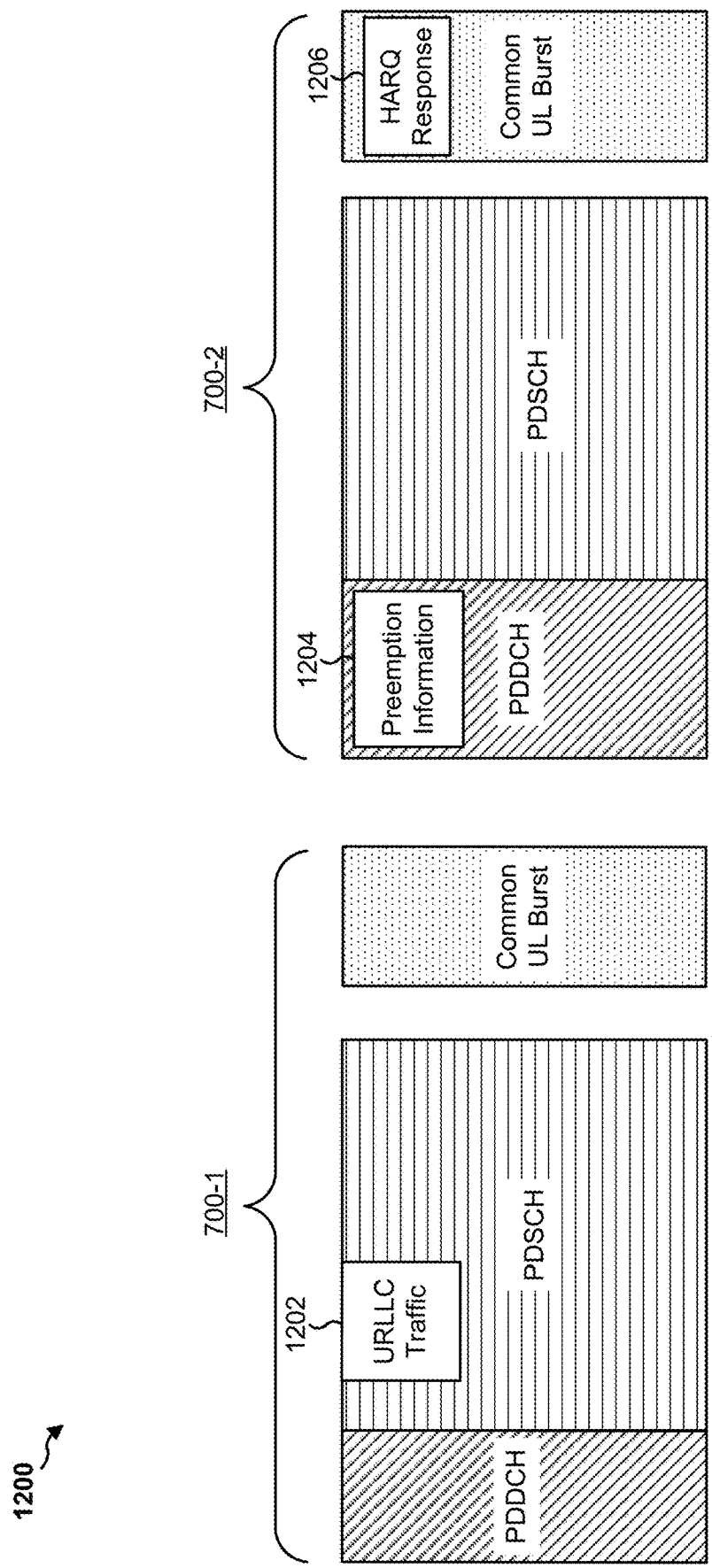
FIG. 12 is a diagram illustrating an example of providing subsequent-slot preemption information for user equipment associated with a subsequent-slot HARQ response configuration.

FIG. 12 is a diagram illustrating an example 1200 of providing subsequent-slot preemption information for user equipment associated with a subsequent-slot HARQ response configuration. FIG. 12 describes preemption information and preempted network traffic with regard to slots. In some aspects, the slots may include DL-centric slots or subframes, which are described in more detail in connection with FIG. 7, above. Additionally, or alternatively, the slots may include another type of slot, or a downlink portion of a slot. For the purpose of FIG. 12, assume that a BS 110 transmits traffic on a slot to a UE 120. Assume further that the UE 120 is configured to provide a next-slot HARQ response. In some aspects, the UE 120 may be configured to provide a subsequent-slot HARQ response, such as a next-slot (N+1) HARQ response, an N+2 HARQ response, an N+3 HARQ response, and/or the like. As used herein, a subsequent-slot HARQ configuration may refer to a configuration to perform a HARQ response within a quantity of HARQ interlaces that causes the UE 120 to provide the response in a next slot after traffic is received (e.g., three or more interlaces, and/or the like).

As shown in FIG. 12, the UE 120 receives a first type of traffic 1202 (e.g., URLLC traffic and/or the like) that preempts a second type of traffic (e.g., eMBB traffic and/or the like) during a first slot (e.g., a DL-centric slot 700-1). Here, the UE 120 is configured for next-slot HARQ response. Therefore, the UE 120 is not capable of and/or configured to provide a HARQ response for the interrupted traffic within the first slot.

As shown by reference number 1204, when the UE 120 is configured to provide a next-slot HARQ response, the BS 110 may provide preemption information as part of a second slot (e.g., a DL-centric slot 700-2). For example, and as shown, the BS 110 may provide the preemption information as part of a PDCCH of the second slot. In some aspects, such as when the PDCCH uses a narrowband configuration, the PDCCH may have unused bandwidth in which the preemption information can be provided. Thus, interruption of the DL data portions of the first slot and the second slot is reduced, which improves downlink performance of UE 120. In some aspects, the preemption information may be provided in a different portion of the second slot, such as the PDSCH, a different channel of the second slot than a channel associated with the PDSCH, and/or the like.

As shown by reference number 1206, the UE 120 provides a HARQ response as part of a common UL burst of the second slot. For example, the HARQ response may identify traffic, of the second type of traffic, that was interrupted by the first type of traffic 1202. In this way, the UE 120 causes retransmission of the second type of traffic, which improves downlink performance of the UE 120 when the second type of traffic, en route to the UE 120, is interrupted. In some aspects, the HARQ response may correspond to the first type of traffic 1202. For example, the HARQ response may indicate successful receipt of the first type of traffic 1202. In some aspects, the HARQ response may correspond to the first type of traffic 1202 and the second type of traffic. For example, the HARQ response may indicate successful receipt of the first type of traffic 1202 and unsuccessful receipt of the second type of traffic. In some aspects, the HARQ response may include separate HARQ responses for the first type of traffic 1202 and the second type of traffic. In some aspects, the HARQ response may jointly encode a HARQ response for the first type of traffic 1202 and a HARQ response for the second type of traffic.

As indicated above, FIG. 12 is provided as an example. Other examples are possible and may differ from what was described with respect to FIG. 12.

Figure 13A:
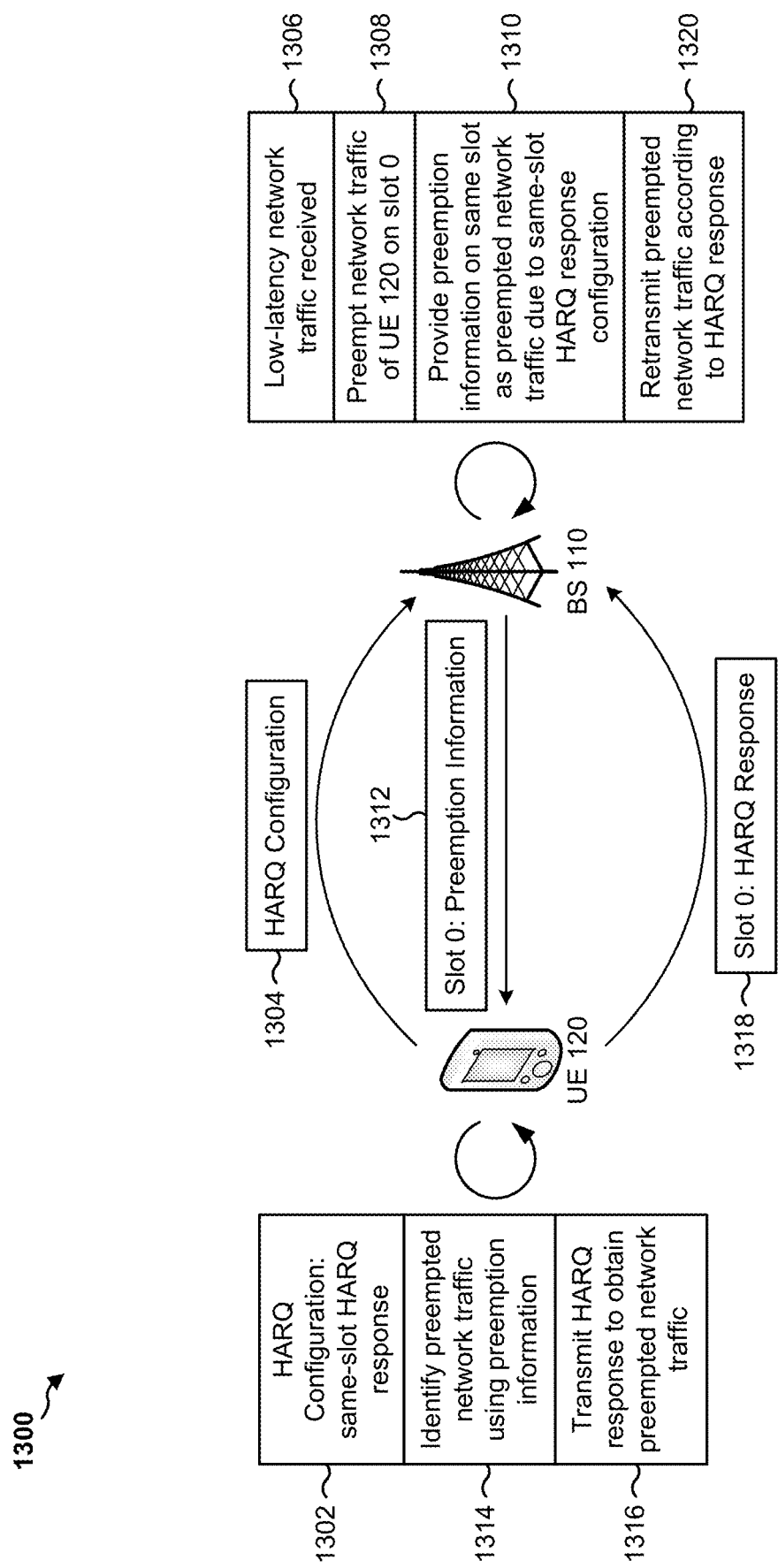
FIGS. 13A and 13B are diagrams illustrating examples of retransmission of interrupted network traffic based at least in part on a dynamic HARQ configuration of a user equipment.
Figure 13B:
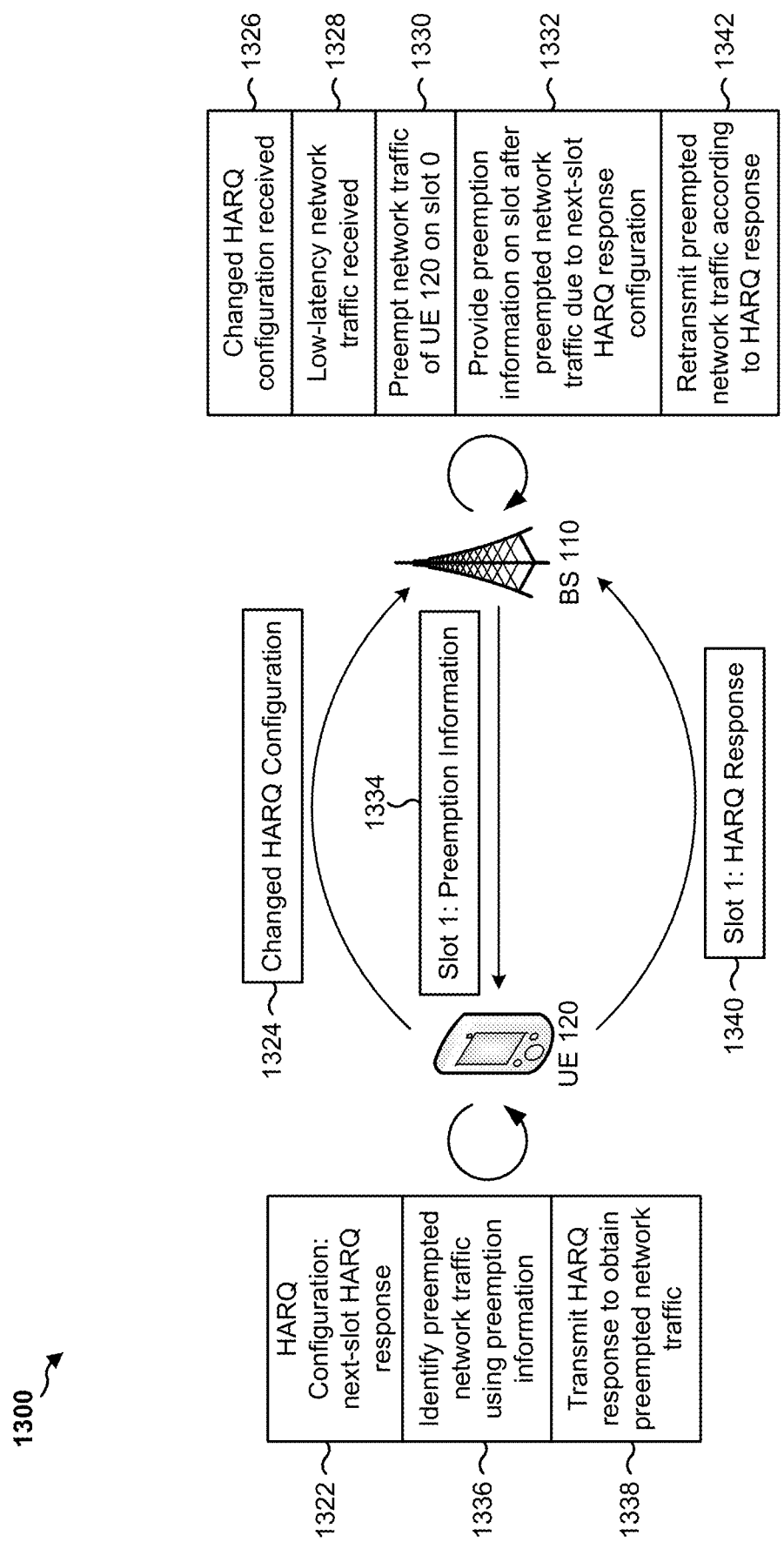

FIGS. 13A and 13B are diagrams illustrating examples 1300 of retransmission of interrupted network traffic based at least in part on a dynamic HARQ configuration of a user equipment. For the purpose of FIGS. 13A and 13B, assume that a UE 120 is capable of dynamic reconfiguration of a HARQ configuration of the UE 120. For example, the UE 120 may change from a same-slot HARQ configuration to a subsequent-slot HARQ configuration based at least in part on available resources, network traffic, predicted traffic, and/or other factors. As described above, the same-slot HARQ configuration and/or the subsequent-slot HARQ configuration may correspond to different HARQ interlace structures of the UE 120.

As shown in FIG. 13A, and by reference number 1302, the UE 120 may be associated with a same-slot HARQ configuration. As shown by reference number 1304, the UE 120 may provide information identifying the same-slot HARQ configuration (e.g., based at least in part on a HARQ interlace structure of the UE 120) to a BS 110. In some aspects, the BS 110 may determine the HARQ configuration and/or may provide information identifying the HARQ configuration to the UE 120 (e.g., based at least in part on a default configuration of the UE 120, network conditions, and/or the like). Assume that the BS 110 stores information identifying the same-slot HARQ configuration of the UE 120.

As shown by reference number 1306, the BS 110 may receive low-latency network traffic. The low-latency network traffic may include a type of network traffic that is to be provided according to a particular service level agreement, a latency requirement, a throughput requirement, a reliability requirement, and/or the like. For example, the low-latency network traffic may include an URLLC type of network traffic, and/or the like.

As shown by reference number 1308, the BS 110 may determine to preempt network traffic en route to the UE 120 on slot 0. For example, the type of network traffic to be preempted may be associated with a lower priority or latency requirement than the low-latency network traffic. Here, the slot numerology (e.g., slot 0, slot 1, etc.) is selected for illustrative purposes only, and implementations described herein are not limited to any particular slot or subframe of a radio frame.

As shown by reference number 1310, the BS 110 may determine to provide preemption information on the same slot (e.g., slot 0) as the preempted network traffic (e.g., the type of network traffic to be preempted). As further shown, the BS 110 may provide the preemption information on slot 0 due to the same-slot HARQ response configuration of the UE 120 (e.g., to enable the UE 120 to provide a same-slot HARQ response to obtain the preempted network traffic). As shown by reference number 1312, and as described in more detail in connection with FIGS. 9-11B, the BS 110 provides the preemption information on slot 0.

As shown by reference number 1314, the UE 120 identifies the preempted network traffic (e.g., the type of network traffic to be preempted) using the preemption information. For example, the preemption information may identify resource blocks, slots, mini-slots, channels, and/or the like, that were preempted by the low-latency network traffic. As shown by reference number 1316, the UE 120 transmits a HARQ response to obtain the preempted network traffic (e.g., the type of network traffic to be preempted). For example, the HARQ response may identify the preempted network traffic to cause the BS 110 to retransmit the preempted network traffic. As shown by reference number 1318, the UE 120 provides the HARQ response on slot 0

(e.g., the slot on which the low-latency network traffic interrupted the preempted network traffic). For example, the UE 120 may provide the HARQ response as part of a common UL burst of slot 0.

As shown by reference number 1320, the BS 110 may retransmit the preempted network traffic according to the HARQ response. In this way, the UE 120 causes retransmission of the preempted network traffic using a same-slot HARQ response according to preemption information received within the same slot in which the preempted network traffic was scheduled to be received. Further, in some cases, the preemption information may be provided simultaneously with or as part of the same mini-slot as the preempting network traffic, which allows the UE 120 to conserve processor and buffer resources that would otherwise be used to attempt to decode and/or process the low-latency network traffic. For example, in a situation where the preempting network traffic is destined for a device other than the UE 120, the UE 120 may not benefit from decoding the preempting network traffic and, thus, it may be beneficial for the UE 120 to skip decoding or processing the preempting network traffic.

As shown in FIG. 13B, and by reference number 1322, the HARQ configuration of the UE 120 may change to a next-slot HARQ response configuration (e.g., due to network conditions, resource availability of the UE 120, a traffic prediction, etc.). As shown by reference number 1324, the UE 120 may provide information identifying the changed HARQ configuration, as the next-slot HARQ response configuration, to the BS 110 (e.g., based at least in part on a changed HARQ interlace structure of the UE 120). In some aspects, the BS 110 may determine the changed HARQ configuration (e.g., due to network conditions, resource availability of the BS 110 and/or UE 120, a traffic prediction, etc.), and may provide information to the UE 120 identifying the changed HARQ configuration. As shown by reference number 1326, the BS 110 may receive and store the changed HARQ configuration.

As shown by reference number 1328, the BS 110 receives low-latency network traffic (e.g., network traffic of a type associated with a low latency). As shown by reference number 1330, the BS 110 determines to preempt network traffic en route to UE 120 on slot 0. As indicated above, the slot numerology is selected for illustrative purposes only, and implementations described herein are not limited to any particular slot or subframe of a radio frame.

As shown by reference number 1332, the BS 110 determines to provide preemption information to the UE 120 on a slot after slot 0 due to the next-slot HARQ response configuration of the UE 120. For example, when the UE 120 is associated with a next-slot HARQ response configuration, the BS 110 may reduce interruption of a downlink data portion of slot 0 and/or usage of a dedicated channel for preemption information by providing the preemption information as part of slot 1 (e.g., as part of downlink control information or a PDDCH of slot 1). As shown by reference number 1334, and as described in more detail in connection with FIG. 12, the BS 110 provides the preemption information on slot 1.

As shown by reference number 1336, the UE 120 identifies the preempted network traffic using the preemption information. For example, the preemption information may identify resource blocks, slots, mini-slots, channels, and/or the like, that were preempted by the low-latency network traffic. As shown by reference number 1338, the UE 120 determines to transmit a HARQ response identifying the preempted network traffic to obtain the preempted network traffic (e.g., to cause retransmission of the preempted network traffic). As shown by reference number 1340, the UE 120 provides the HARQ response as part of slot 1. For example, the UE 120 may provide the HARQ response as part of a common UL burst of slot 1. In some aspects, the HARQ response may identify the preempting network traffic (e.g., may indicate successful receipt of the preempting network traffic). In some aspects, the HARQ response may identify the preempted network traffic and the preempting network traffic.

As shown by reference number 1342, the BS 110 may retransmit the preempted network traffic according to the HARQ response. In this way, the UE 120 causes retransmission of the preempted network traffic using a next-slot HARQ response according to preemption information received within the next slot after the preempted network traffic. Further, the preemption information may be provided as part of downlink control information of the next slot, which improves downlink performance of the UE 120.

As indicated above, FIGS. 13A and 13B are provided as examples. Other examples are possible and may differ from what was described with respect to FIGS. 13A and 13B.

FIG. 14 is a flow chart 1400 of a method of wireless communication. The method may be performed by a UE (e.g., the UE 120 of FIG. 1 and/or the like).

At 1410, the UE may receive, at a first location in a downlink signal, preemption information that identifies a second location of a first type of traffic that preempts a second type of traffic, the first location relative to the second location being based at least in part on a hybrid automatic repeat request (HARQ) configuration of the UE. For example, the UE may receive, at a first location in a downlink signal, preemption information that identifies a second location of a first type of traffic (e.g., URLLC traffic, and/or the like) that preempts a second type of traffic (e.g., eMBB traffic, and/or the like), where the first location relative to the second location may be based at least in part on a HARQ configuration of the UE. In some aspects, the preemption information is received periodically. In some aspects, the second location is identified based at least in part on an offset associated with the preemption information.

At 1420, the UE may receive the first type of traffic at the second location. For example, the UE may receive the first type of traffic (e.g., URLLC traffic and/or the like) at the second location (e.g., where the second type of traffic was scheduled to be received). The first type of traffic may preempt or interrupt the second type of traffic at the second location.

At 1430, the UE may generate a HARQ response associated with the first type of traffic. For example, the UE may generate a HARQ response associated with the first type of traffic and/or the second type of traffic. The HARQ response may identify the second type of traffic, and may cause the BS to retransmit the second type of traffic to the UE. In some aspects, the HARQ response may identify the first type of traffic, and may indicate that the first type of traffic was successfully received. In some aspects, the HARQ response may identify both the first type of traffic and the second type of traffic.

At 1440, the UE may transmit the HARQ response based at least in part on the HARQ configuration of the UE. For example, if the HARQ configuration of the UE is a same-slot HARQ configuration, then the UE may transmit the HARQ response in a same slot in which the first type of traffic is received. If the HARQ configuration of the UE is a subsequent-slot HARQ configuration, then the UE may transmit the HARQ response in a subsequent slot to the slot in which the first type of traffic is received.

In some aspects, the HARQ configuration may indicate that the UE is configured to provide a same-slot HARQ response, and the preemption information and the first type of traffic may be received in a same slot on which the second type of traffic was scheduled to be received based at least in part on the UE being configured to provide the same-slot HARQ response.

In some aspects, the preemption information may be received after a time at which reception of the second type of traffic has started. In some aspects, the HARQ response may be transmitted for the first type of traffic during a common uplink burst portion of the same slot.

In some aspects, the first type of traffic may be scheduled to be received on a first frequency band, and the preemption information may be received on a second frequency band that is different than the first frequency band. In some aspects, the first type of traffic may be scheduled to be received on a first frequency band, and the preemption information may be received on a second frequency band that at least partially overlaps the first frequency band. In some aspects, the preemption information may be received in a particular slot or mini-slot, and the first type of traffic may be scheduled to be received on the particular slot or mini-slot.

In some aspects, the HARQ configuration may indicate that the UE is configured to provide the HARQ response associated with the second type of traffic in a subsequent slot after a first slot in which the second type of traffic is received. The first type of traffic may be scheduled to be received in the first slot. The preemption information may be received in a second slot after the first slot based at least in part on the HARQ configuration, wherein the second slot is not later than the subsequent slot. Additionally, or alternatively, the preemption information may be received as a portion of a downlink control portion of the second slot. Additionally, or alternatively, the HARQ response for the first type of traffic may be provided during a common uplink burst portion of the second slot. In some aspects, the first type of traffic may be associated with an ultra-reliable low-latency communication service.

Although FIG. 14 shows example blocks of a method of wireless communication, in some aspects, the method may include additional blocks, fewer blocks, different blocks, or differently arranged blocks than those shown in FIG. 14. Additionally, or alternatively, two or more blocks shown in FIG. 14 may be performed in parallel.

FIG. 15 is a flow chart 1500 of a method of wireless communication. The method may be performed by a base station (e.g., the BS 110 of FIG. 1, and/or the like).

At 1510, the base station may determine a hybrid automatic repeat request (HARQ) configuration of user equipment (a UE). For example, the base station may determine a HARQ configuration of the UE based at least in part on receiving information identifying the HARQ configuration, causing the UE to implement the HARQ configuration, and/or the like. The HARQ configuration may include a same-slot HARQ response configuration, a subsequent-slot HARQ response configuration, a quantity of HARQ interlaces or HARQ interlace structure, and/or the like.

At 1520, the base station may provide, at a first location in a downlink signal, preemption information that identifies a second location of a first type of traffic that preempts a second type of traffic, the first location relative to the second location being based at least in part on the HARQ configuration. For example, the base station may provide, at a first location in a downlink signal, preemption information that identifies a second location of a first type of traffic (e.g., URLLC traffic and/or the like) that preempts a second type of traffic (e.g., eMBB traffic and/or the like), where the first location relative to the second location may be based at least in part on the HARQ configuration. In some aspects, the base station may provide the preemption information periodically. In some aspects, the base station may identify the second location based at least in part on an offset associated with the preemption information.

At 1530, the base station may provide the first type of traffic at the second location. For example, the base station may provide (e.g., transmit to the UE described in connection with block 1520, and/or another UE) the first type of traffic at the second location. Thus, the first type of traffic may preempt the second type of traffic at the second location.

At 1540, the base station may receive a HARQ response associated with the first type of traffic. For example, the base station may receive, from the UE, a HARQ response associated with the first type of traffic to cause retransmission of the second type of traffic that was preempted by the first type of traffic. In some aspects, the HARQ response may identify the first type of traffic (e.g., may include an ACK for the first type of traffic) and/or the second type of traffic (e.g., may include a NACK for the second type of traffic)

At 1550, the base station may transmit the second type of traffic based at least in part on the HARQ response. For example, the base station may transmit (e.g., provide) the second type of traffic to the UE based at least in part on the HARQ response. In some aspects, the base station may receive information identifying a changed HARQ configuration of the UE. The base station may provide the preemption information at a changed location relative to the first type of traffic based at least in part on the changed HARQ configuration.

Although FIG. 15 shows example blocks of a method of wireless communication, in some aspects, the method may include additional blocks, fewer blocks, different blocks, or differently arranged blocks than those shown in FIG. 15. Additionally, or alternatively, two or more blocks shown in FIG. 15 may be performed in parallel.

Figure 16:
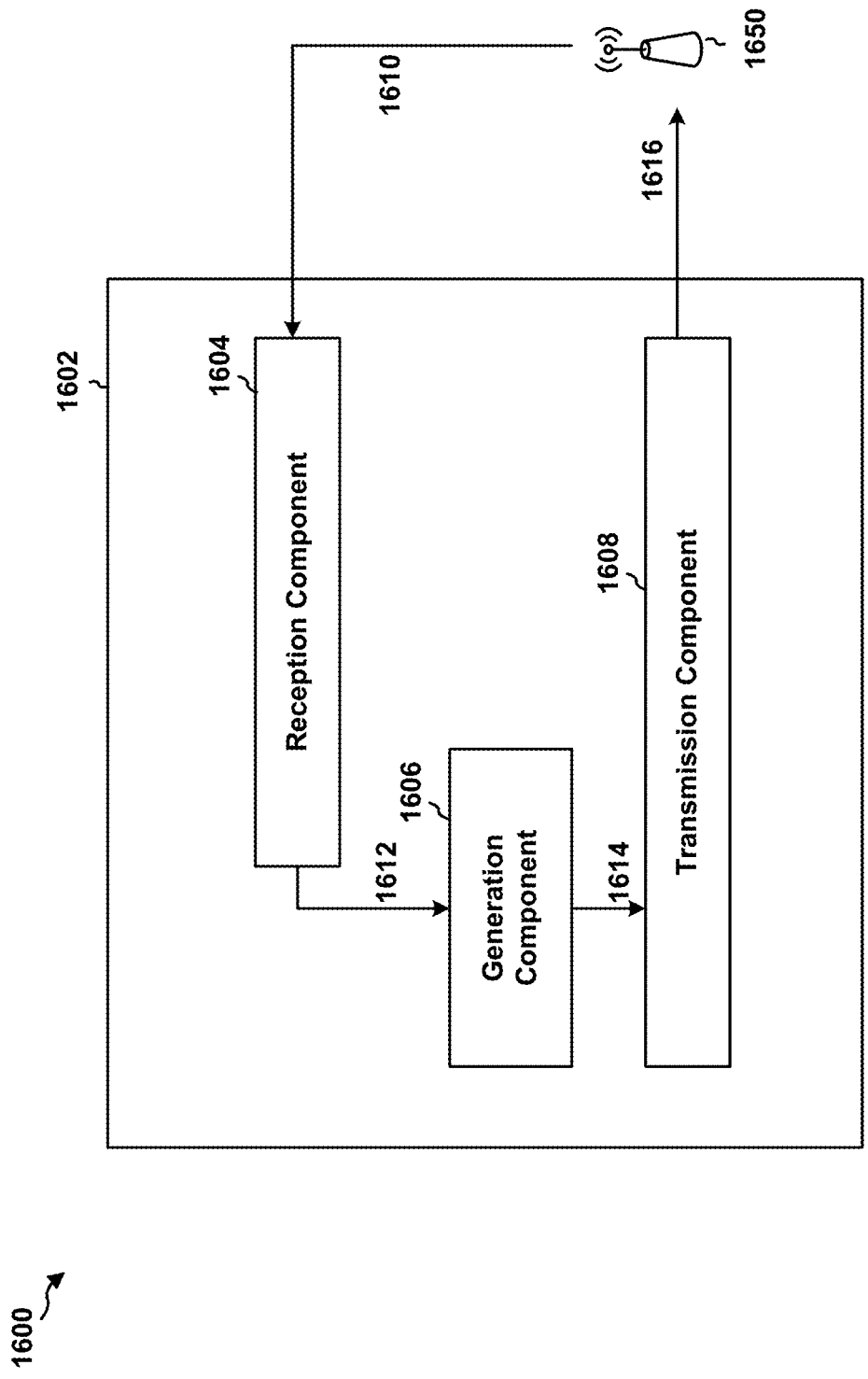
FIG. 16 is a conceptual data flow diagram illustrating the data flow between different modules/means/components in an example apparatus.

FIG. 16 is a conceptual data flow diagram 1600 illustrating the data flow between different modules/means/components in an example apparatus 1602. The apparatus 1602 may be a UE (e.g., the UE 120 and/or the like). In some aspects, the apparatus 1602 includes a reception component 1604, a generation component 1606, and/or a transmission component 1608.

The reception component 1604 may receive data 1610 from BS 1650 (e.g., BS 110 and/or the like). The data 1610 may include, for example, preemption information, a first type of traffic, a second type of traffic, and/or the like. The reception component 1604 may provide data 1612 to the generation component 1606. The data 1612 may include, for example, the preemption information, the first type of traffic, the second type of traffic, information identifying traffic to be retransmitted, and/or the like. The generation component 1606 may generate a HARQ response associated with the first type of traffic. The generation component may provide data 1614 (e.g., a HARQ response, etc.) to the transmission component 1608. The transmission component may transmit signals 1616 to the BS 1650 or another device. The signals 1616 may be generated based at least in part on the data 1614, and may include a HARQ response, information identifying a HARQ configuration of the apparatus 1602, and or the like.

The apparatus may include additional components that perform each of the blocks of the algorithm in the aforementioned flow chart of FIG. 14. As such, each block in the aforementioned flow chart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of components (e.g., one or more components) shown in FIG. 16 may perform one or more functions described as being performed by another set of components shown in FIG. 16.

Figure 17:
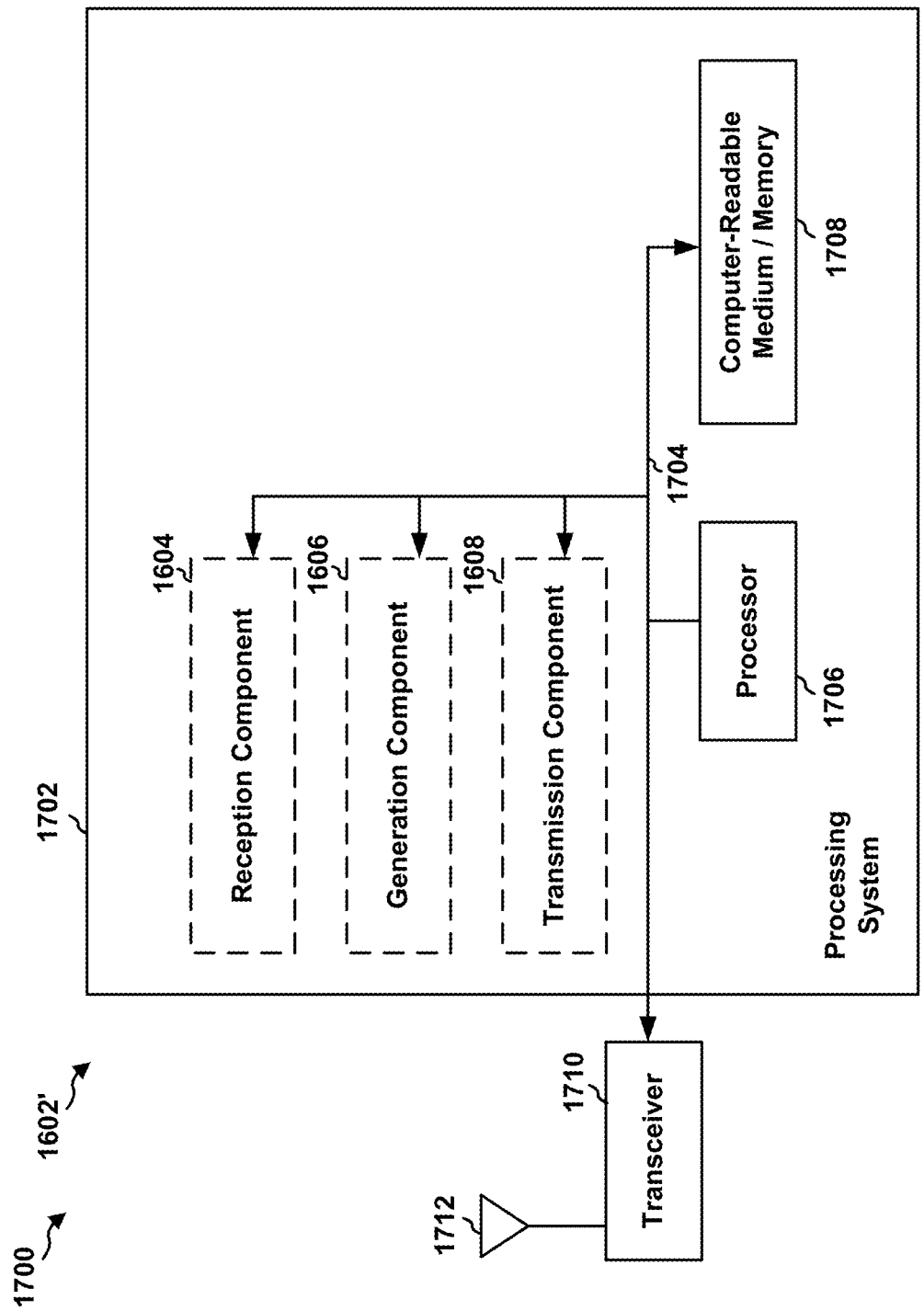
FIG. 17 is a diagram illustrating an example of a hardware implementation for an apparatus employing a processing system.

FIG. 17 is a diagram 1700 illustrating an example of a hardware implementation for an apparatus 1602' employing a processing system 1702. The apparatus 1602' may be a UE.

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware components, represented by the processor 1706, the components 1604, 1606, 1608, and the computer-readable medium/memory 1708. The bus 1704 may also link various other circuits such as timing sources, peripherals, voltage regulators, and power management circuits, which are well known in the art, and therefore, will not be described any further.

The processing system 1702 may be coupled to a transceiver 1710. The transceiver 1710 is coupled to one or more antennas 1712. The transceiver 1710 provides a means for communicating with various other apparatus over a transmission medium. The transceiver 1710 receives a signal from the one or more antennas 1712, extracts information from the received signal, and provides the extracted information to the processing system 1702, specifically the reception component 1604. In addition, the transceiver 1710 receives information from the processing system 1702, specifically the transmission component 1608, and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/memory 1708. The software, when executed by the processor 1706, causes the processing system 1702 to perform the various functions described supra for any particular apparatus. The computer-readable medium/memory 1708 may also be used for storing data that is manipulated by the processor 1706 when executing software. The processing system further includes at least one of the components 1604, 1606, 1608. The components may be software components running in the processor 1706, resident/stored in the computer readable medium/memory 1708, one or more hardware components coupled to the processor 1706, or some combination thereof. The processing system 1702 may be a component of the UE 120 and may include the memory 282 and/or at least one of the TX MIMO processor 266, the receive processor 258, and/or the controller/processor 280.

In some aspects, the apparatus 1602/1602' for wireless communication includes means for receiving, at a first location in a downlink signal, preemption information that identifies a second location of a first type of traffic that preempts a second type of traffic, the first location relative to the second location being based at least in part on a hybrid automatic repeat request (HARQ) configuration of the UE; means for receiving the first type of traffic at the second location; means for generating a HARQ response associated with the first type of traffic; and means for transmitting the HARQ response based at least in part on the HARQ configuration of the UE. The aforementioned means may be one or more of the aforementioned components of the apparatus 1602 and/or the processing system 1702 of the apparatus 1602' configured to perform the functions recited by the aforementioned means. As described supra, the processing system 1702 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 17 is provided as an example. Other examples are possible and may differ from what was described in connection with FIG. 17.

Figure 18:
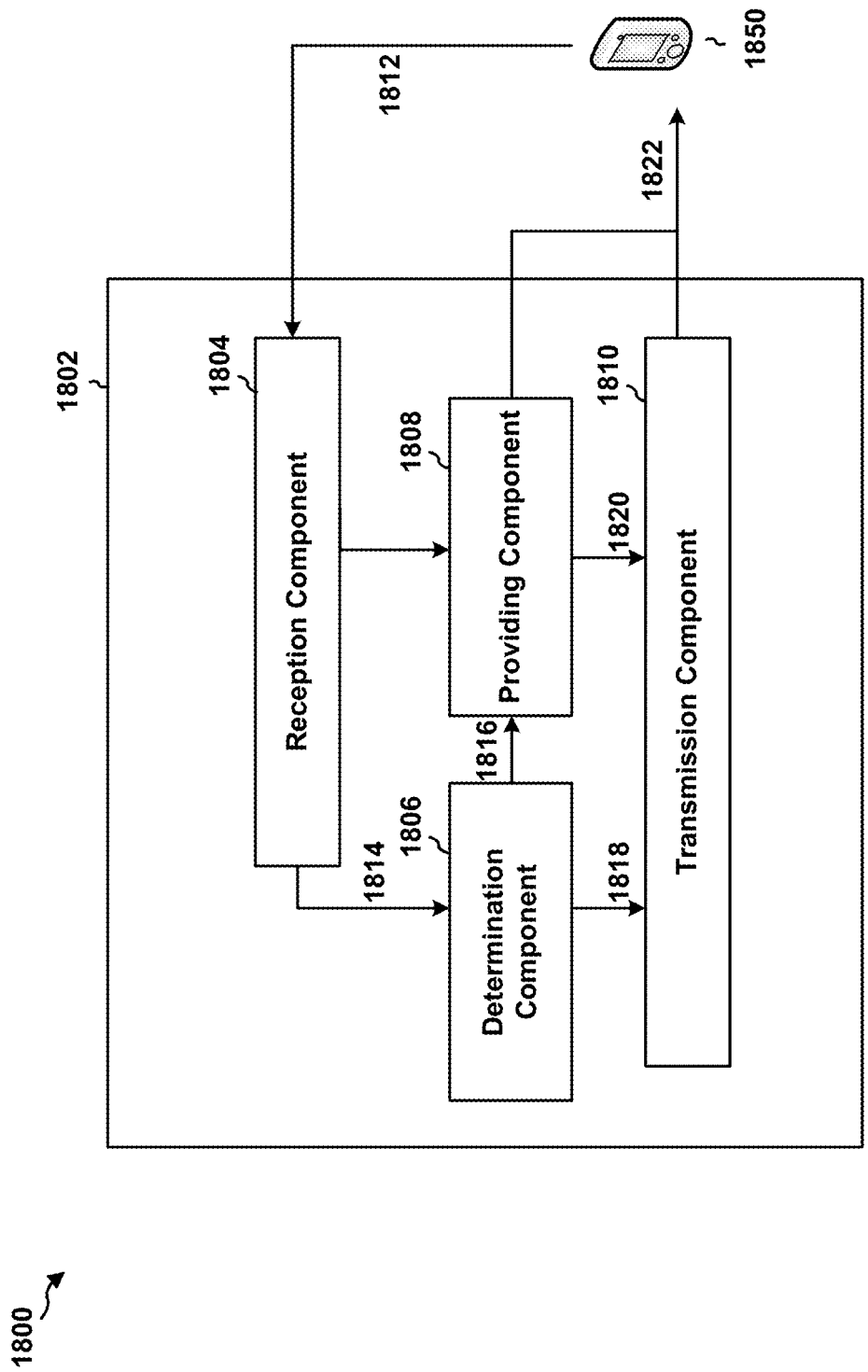
FIG. 18 is a conceptual data flow diagram illustrating the data flow between different modules/means/components in another example apparatus.

FIG. 18 is a conceptual data flow diagram 1800 illustrating the data flow between different components/means/components in an example apparatus 1802. The apparatus 1802 may be a base station. In some aspects, the apparatus 1802 includes a reception component 1804, a determination component 1806, a providing component 1808, and/or a transmission component 1810.

The reception component 1804 may receive data 1812 from a UE 1850 (e.g., the UE 120 and/or the like). The data 1812 may include, for example, a HARQ configuration of the UE 1850, a changed HARQ configuration of the UE 1850, a HARQ response associated with a type of traffic, and/or the like. The reception component 1804 may provide data 1814 to the determination component 1806. The data 1814 may include, for example, information identifying the HARQ configuration or the changed HARQ configuration. The determination component 1806 may determine the HARQ configuration of the UE 1850 based at least in part on the data 1814. The determination component 1806 may provide data 1816 to the providing component 1808. The data 1816 may include, for example, information identifying a type of traffic to be provided to the UE 1850, information identifying a location or time at which the type of traffic is to be provided, preemption information, information identifying a time at which the preemption information is to be provided, and/or the like. In some aspects, the determination component 1806 may provide data 1818 to the transmission component 1810. The data 1818 may include part of, or all of, the data 1816. In some aspects, the providing component 1808 may provide data 1820 to the transmission component 1810. The data 1820 may include part of, or all of, the data 1816. The providing component 1808 and/or the transmission component 1810 may provide or transmit data 1822 to the UE 1850. The data 1822 may include the first type of traffic, the second type of traffic, the preemption information, and/or the like.

The apparatus may include additional components that perform each of the blocks of the algorithm in the aforementioned flow chart of FIG. 15. As such, each block in the aforementioned flow chart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of components (e.g., one or more components) shown in FIG. 18 may perform one or more functions described as being performed by another set of components shown in FIG. 18.

Figure 19:
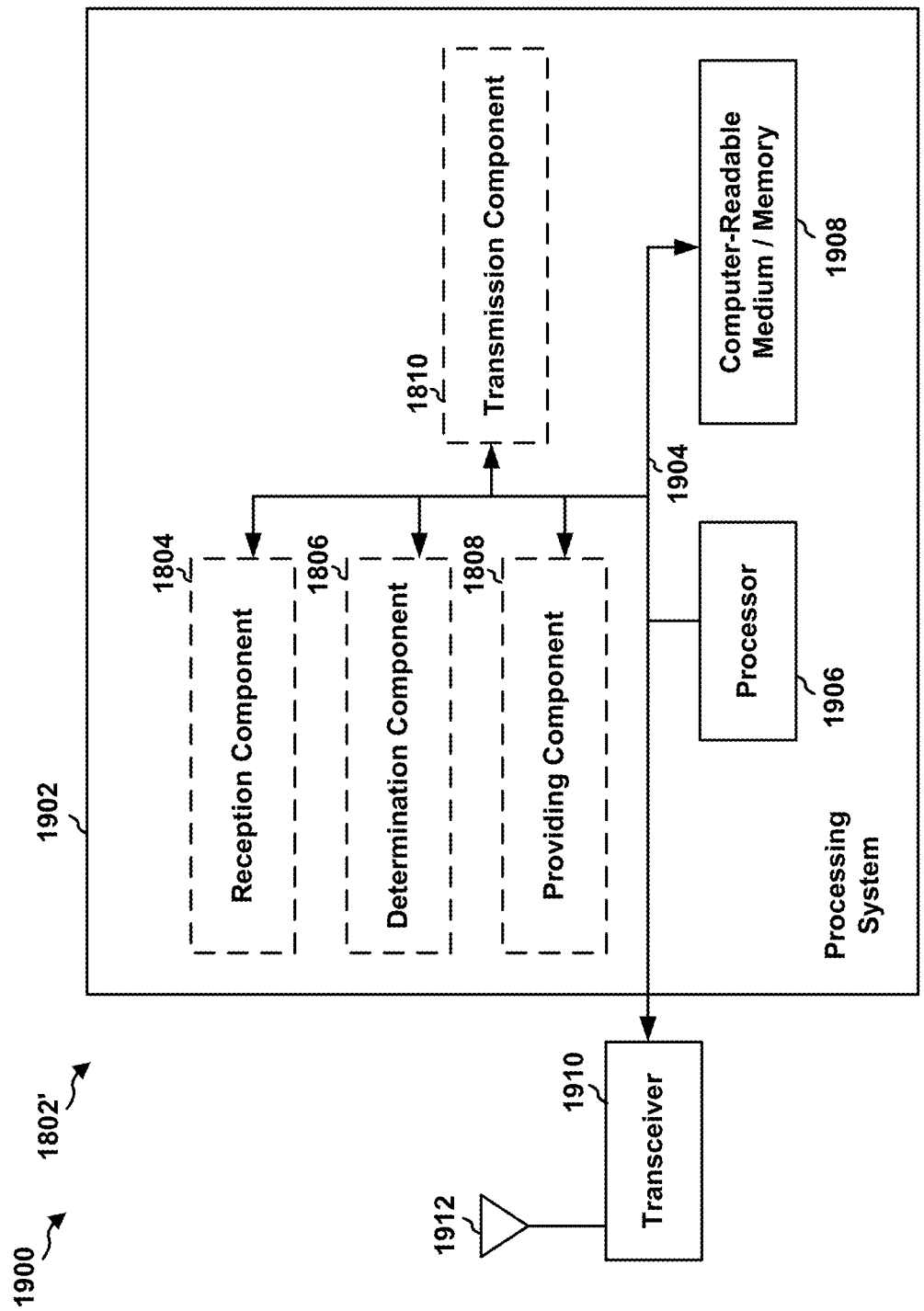
FIG. 19 is a diagram illustrating an example of a hardware implementation for another apparatus employing a processing system.

FIG. 19 is a diagram 1900 illustrating an example of a hardware implementation for an apparatus 1802' employing a processing system 1902. The apparatus 1802' may be a base station (e.g., the BS 110 of FIG. 1).

The processing system 1902 may be implemented with a bus architecture, represented generally by the bus 1904. The bus 1904 may include any number of interconnecting buses and bridges depending on the specific application of the processing system 1902 and the overall design constraints. The bus 1904 links together various circuits including one or more processors and/or hardware components, represented by the processor 1906, the components 1804, 1806, 1808, 1810, and the computer-readable medium/memory 1908. The bus 1904 may also link various other circuits such as timing sources, peripherals, voltage regulators, and power management circuits, which are well known in the art, and therefore, will not be described any further.

The processing system 1902 may be coupled to a transceiver 1910. The transceiver 1910 is coupled to one or more antennas 1912. The transceiver 1910 provides a means for communicating with various other apparatus over a transmission medium. The transceiver 1910 receives a signal from the one or more antennas 1912, extracts information from the received signal, and provides the extracted information to the processing system 1902, specifically the reception component 1804. In addition, the transceiver 1910 receives information from the processing system 1902, specifically the transmission component 1810, and based at least in part on the received information, generates a signal to be applied to the one or more antennas 1912. The processing system 1902 includes a processor 1906 coupled to a computer-readable medium/memory 1908. The processor 1906 is responsible for general processing, including the execution of software stored on the computer-readable medium/memory 1908. The software, when executed by the processor 1906, causes the processing system 1902 to perform the various functions described supra for any particular apparatus. The computer-readable medium/memory 1908 may also be used for storing data that is manipulated by the processor 1906 when executing software. The processing system further includes at least one of the components 1804, 1806, 1808, and 1810. The components may be software components running in the processor 1906, resident/stored in the computer readable medium/memory 1908, one or more hardware components coupled to the processor 1906, or some combination thereof. The processing system 1902 may be a component of the BS 110 and may include the memory 242 and/or at least one of the TX MIMO processor 230, the receive processor 238, and/or the controller/processor 240.

In some aspects, the apparatus 1902/1802' for wireless communication includes means for determining a HARQ configuration of a UE; means for providing, at a first location in a downlink signal, preemption information that identifies a second location of a first type of traffic that preempts a second type of traffic, the first location relative to the second location being based at least in part on the HARQ configuration; means for providing the first type of traffic at the second location; receiving a HARQ response associated with the first type of traffic; means for transmitting the second type of traffic based at least in part on the HARQ response; and means for receiving information identifying a changed HARQ configuration of the UE. The aforementioned means may be one or more of the aforementioned components of the apparatus 1902 and/or the processing system 1902 of the apparatus 1802' configured to perform the functions recited by the aforementioned means. As described supra, the processing system 1902 may include the TX MIMO processor 230, the receive processor 238, and/or the controller/processor 240. As such, in one configuration, the aforementioned means may be the transmit processor 230, the receive processor 238, and/or the controller/processor 240 configured to perform the functions recited by the aforementioned means.

FIG. 19 is provided as an example. Other examples are possible and may differ from what was described in connection with FIG. 19.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:
   receiving, at a first location in a downlink signal, preemption information that identifies a second location of a first type of traffic that preempts a second type of traffic, the first location relative to the second location being based at least in part on a hybrid automatic repeat request (HARQ) configuration of the UE, the HARQ configuration indicating a configuration to perform a HARQ response, associated with the second type of traffic, within a quantity of HARQ interlaces that cause the UE to provide the HARQ response in a subsequent slot after a first slot in which the second type of traffic is received, the quantity of HARQ interlaces being two or more interlaces, and the first type of traffic being scheduled to be received in the first slot;
   receiving the first type of traffic at the second location;
   generating the HARQ response; and
   transmitting the HARQ response based at least in part on the HARQ configuration of the UE.

2. The method of claim 1, wherein the preemption information is received after a time at which reception of the second type of traffic has started.

3. The method of claim 1, wherein the HARQ response is transmitted during a common uplink burst portion.

4. The method of claim 1, wherein the first type of traffic is scheduled to be received on a first frequency band; and
   wherein the preemption information is received on a second frequency band that is different than the first frequency band.

5. The method of claim 1, wherein the first type of traffic is scheduled to be received on a first frequency band; and
   wherein the preemption information is received on a second frequency band that at least partially overlaps the first frequency band.

6. The method of claim 1, wherein the preemption information is received in a particular slot or mini-slot, and
   wherein the first type of traffic is scheduled to be received on the particular slot or mini-slot.

7. The method of claim 1
   wherein the preemption information is received in a second slot after the first slot based at least in part on the HARQ configuration, and
   wherein the second slot is not later than the subsequent slot.

8. The method of claim 7, wherein the preemption information is received as a portion of a downlink control portion of the second slot.

9. The method of claim 7, wherein the HARQ response for the first type of traffic is provided during a common uplink burst portion of the second slot.

10. The method of claim 1, wherein the first type of traffic is associated with an ultra-reliable low-latency communication service.

11. The method of claim 1, wherein the preemption information is received periodically.

12. The method of claim 1, wherein the second location is identified based at least in part on an offset associated with the preemption information.

13. A user equipment (UE) for wireless communication, comprising:
    a memory; and
    one or more processors operatively coupled to the memory, the memory and the one or more processors to:
        receive, at a first location in a downlink signal, preemption information that identifies a second location of a first type of traffic that preempts a second type of traffic, the first location relative to the second location being based at least in part on a hybrid automatic repeat request (HARQ) configuration of the UE, the HARQ configuration indicating a configuration to perform a HARQ response, associated with the second type of traffic, within a quantity of HARQ interlaces that cause the UE to provide the HARQ response in a subsequent slot after a first slot in which the second type of traffic is received, the quantity of HARQ interlaces being two or more interlaces, and the first type of traffic being scheduled to be received in the first slot;
        receive the first type of traffic at the second location;
        generate the HARQ response; and
        transmit the HARQ response based at least in part on the HARQ configuration of the UE.

14. The UE of claim 13, wherein the preemption information is received after a time at which reception of the second type of traffic has started.

15. The UE of claim 13, wherein the HARQ response is transmitted during a common uplink burst portion.

16. The UE of claim 13, wherein the first type of traffic is scheduled to be received on a first frequency band; and
    wherein the preemption information is received on a second frequency band that is different than the first frequency band.

17. The UE of claim 13, wherein the first type of traffic is scheduled to be received on a first frequency band; and
    wherein the preemption information is received on a second frequency band that at least partially overlaps the first frequency band.

18. The UE of claim 13, wherein the preemption information is received in a particular slot or mini-slot, and
    wherein the first type of traffic is scheduled to be received on the particular slot or mini-slot.

19. The UE of claim 13,
    wherein the preemption information is received in a second slot after the first slot based at least in part on the HARQ configuration, and
    wherein the second slot is not later than the subsequent slot.

20. The UE of claim 19, wherein the preemption information is received as a portion of a downlink control portion of the second slot.

21. The UE of claim 19, wherein the HARQ response for the first type of traffic is provided during a common uplink burst portion of the second slot.

22. The UE of claim 13, wherein the first type of traffic is associated with an ultra-reliable low-latency communication service.

23. The UE of claim 13, wherein the preemption information is received periodically.

24. The UE of claim 13, wherein the second location is identified based at least in part on an offset associated with the preemption information.

25. A method of wireless communication for a base station, comprising:

determining a hybrid automatic repeat request (HARQ) configuration of user equipment (a UE);

providing, at a first location in a downlink signal, preemption information that identifies a second location of a first type of traffic that preempts a second type of traffic, the first location relative to the second location being based at least in part on the HARQ configuration;

providing the first type of traffic at the second location;

receiving a HARQ response associated with the first type of traffic, the HARQ configuration indicating a configuration to perform a HARQ response, associated with the second type of traffic, within a quantity of HARQ interlaces that cause the UE to provide the HARQ response in a subsequent slot after a first slot in which the second type of traffic is received, the quantity of HARQ interlaces being two or more interlaces, and the first type of traffic being scheduled to be received in the first slot; and transmitting the second type of traffic based at least in part on the HARQ response.

26. The method of claim 25, wherein information identifying a changed HARQ configuration of the UE is received and the preemption information is provided at a changed location relative to the first type of traffic based at least in part on the changed HARQ configuration.

27. The method of claim 25, wherein the first type of traffic is scheduled to be provided on a first frequency band; and wherein the preemption information is provided on a second frequency band that is different than the first frequency band.

28. A base station for wireless communication, comprising:

a memory; and at least one processor operatively coupled to the memory, the memory and the at least one processor configured to:

determine a hybrid automatic repeat request (HARQ) configuration of user equipment (a UE);

provide, at a first location in a downlink signal, preemption information that identifies a second location of a first type of traffic that preempts a second type of traffic, the first location relative to the second location being based at least in part on the HARQ configuration;

provide the first type of traffic at the second location;

receive a HARQ response associated with the first type of traffic, the HARQ configuration indicating a configuration to perform a HARQ response, associated with the second type of traffic, within a quantity of HARQ interlaces that cause the UE to provide the HARQ response in a subsequent slot after a first slot in which the second type of traffic is received, the quantity of HARQ interlaces being two or more interlaces, and the first type of traffic being scheduled to be received in the first slot; and transmit the second type of traffic based at least in part on the HARQ response.

29. The base station of claim 28, wherein information identifying a changed HARQ configuration of the UE is received and the preemption information is provided at a changed location relative to the first type of traffic based at least in part on the changed HARQ configuration.

30. The base station of claim 28, wherein the first type of traffic is scheduled to be provided on a first frequency band; and wherein the preemption information is provided on a second frequency band that at least partially overlaps the first frequency band.

* * * * *